(12) United States Patent
Cheever et al.

(10) Patent No.: US 10,632,782 B1
(45) Date of Patent: Apr. 28, 2020

(54) CRAFTING MAT ASSEMBLY, METHOD FOR UTILIZING THE SAME AND PACKAGING ASSEMBLY

(71) Applicant: Cricut, Inc., South Jordan, UT (US)

(72) Inventors: Mitchell Alan Cheever, Layton, UT (US); Kristy Lynn Barney, Lehi, UT (US); James A. Elzey, South Jordan, UT (US)

(73) Assignee: Cricut, Inc., South Jordan, UT (US)

( * ) Notice: Subject to any disclaimer, the term of this patent is extended or adjusted under 35 U.S.C. 154(b) by 0 days.

(21) Appl. No.: 16/358,279

(22) Filed: Mar. 19, 2019

(51) Int. Cl.
| | |
|---|---|
| *B44C 1/17* | (2006.01) |
| *B32B 7/027* | (2019.01) |
| *B32B 15/04* | (2006.01) |
| *B32B 15/14* | (2006.01) |
| *B32B 27/06* | (2006.01) |
| *B32B 27/40* | (2006.01) |
| *B32B 27/36* | (2006.01) |
| *D06Q 1/12* | (2006.01) |
| *B65D 73/00* | (2006.01) |
| *B25H 1/04* | (2006.01) |

(52) U.S. Cl.
CPC .............. *B44C 1/1725* (2013.01); *B25H 1/04* (2013.01); *B65D 73/0071* (2013.01); *D06Q 1/12* (2013.01); *B32B 7/027* (2019.01); *B32B 15/046* (2013.01); *B32B 15/14* (2013.01); *B32B 27/065* (2013.01); *B32B 27/36* (2013.01); *B32B 27/40* (2013.01); *B32B 2266/057* (2016.11); *B32B 2307/304* (2013.01); *B32B 2307/306* (2013.01); *B32B 2307/724* (2013.01); *B32B 2307/7265* (2013.01)

(58) Field of Classification Search
CPC ...... A47J 7/005; B44C 1/1712; B44C 1/1716; B44C 1/172; B44C 1/1725; B44C 1/1729; D06Q 1/12; D06Q 1/14
USPC ............................................. 269/302.1, 903
See application file for complete search history.

(56) References Cited

U.S. PATENT DOCUMENTS

2007/0267800 A1* 11/2007 Zeng ..................... A47J 47/005
269/302.1

* cited by examiner

*Primary Examiner* — Tyrone V Hall, Jr.
*Assistant Examiner* — Abbie E Quann
(74) *Attorney, Agent, or Firm* — Honigman LLP

(57) ABSTRACT

A crafting mat includes a container portion and a layered interior body portion. The container portion includes a top layer and a bottom layer connected to the top layer for defining a cavity. The layered interior body portion is disposed within the cavity. The layered interior body portion includes an upper layer, a lower layer and an intermediate layer disposed between the upper layer and the lower layer. A method for utilizing a crafting mat is also disclosed. A packaging assembly including packaging and a crafting mat is also disclosed.

24 Claims, 26 Drawing Sheets

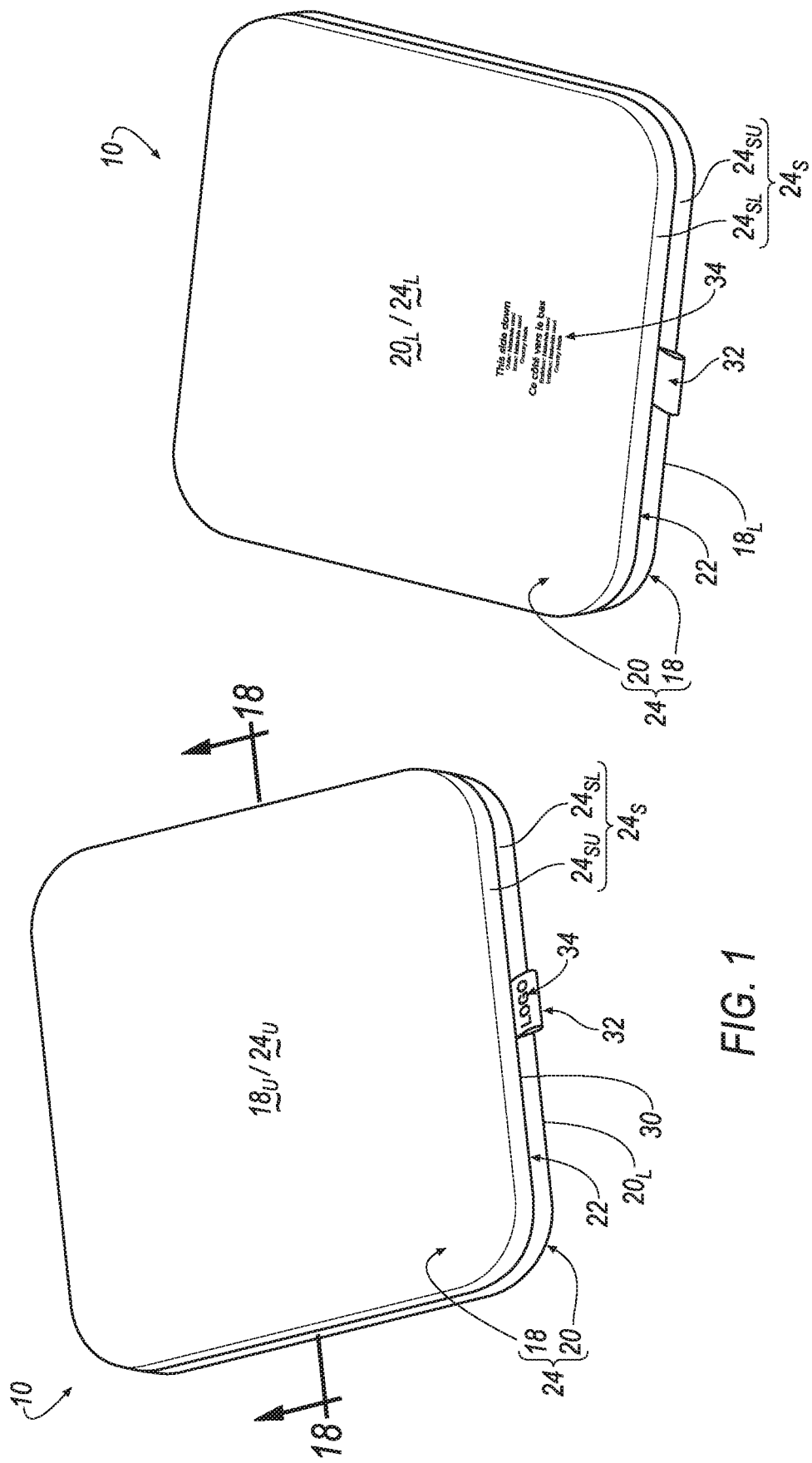

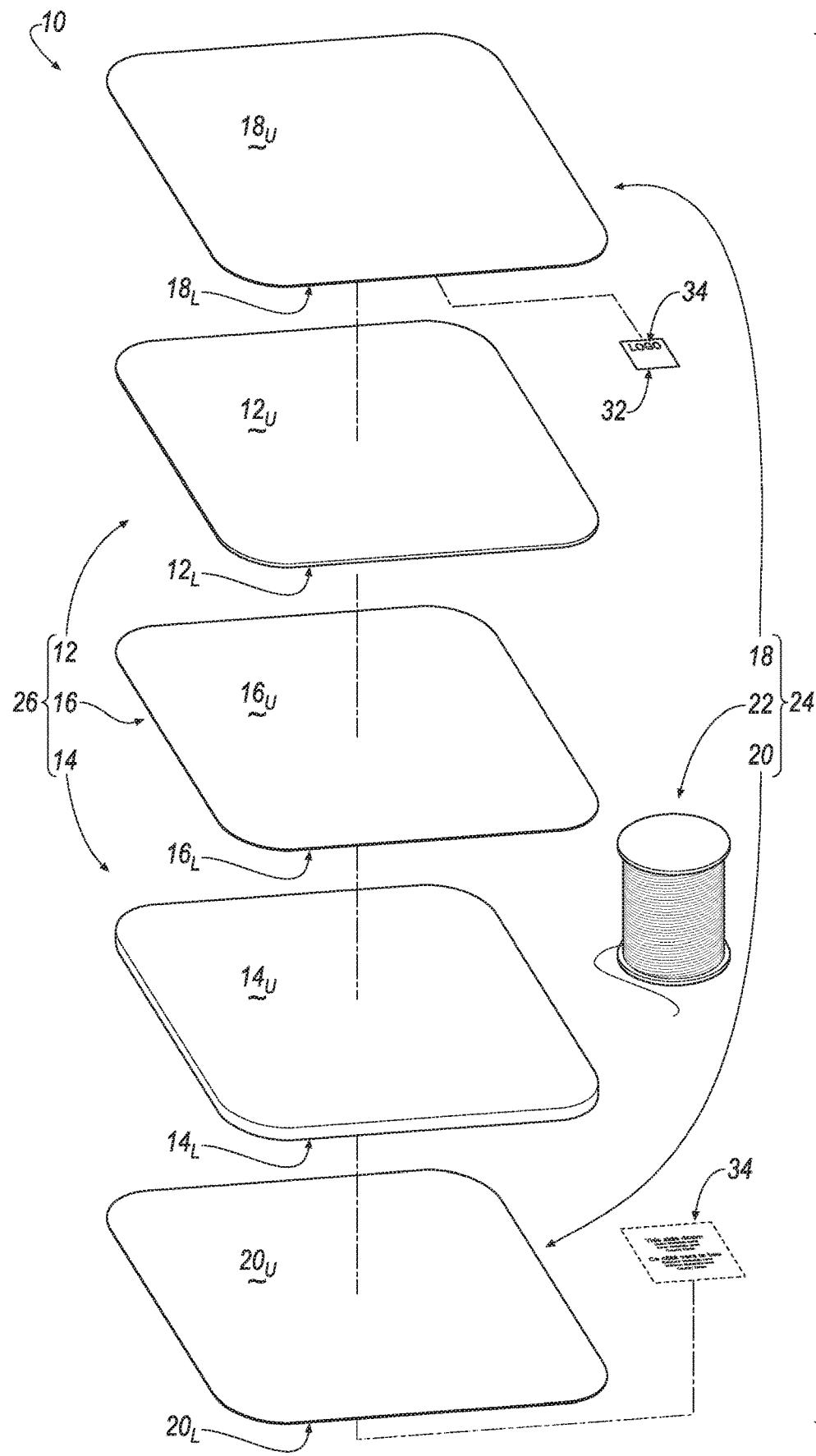

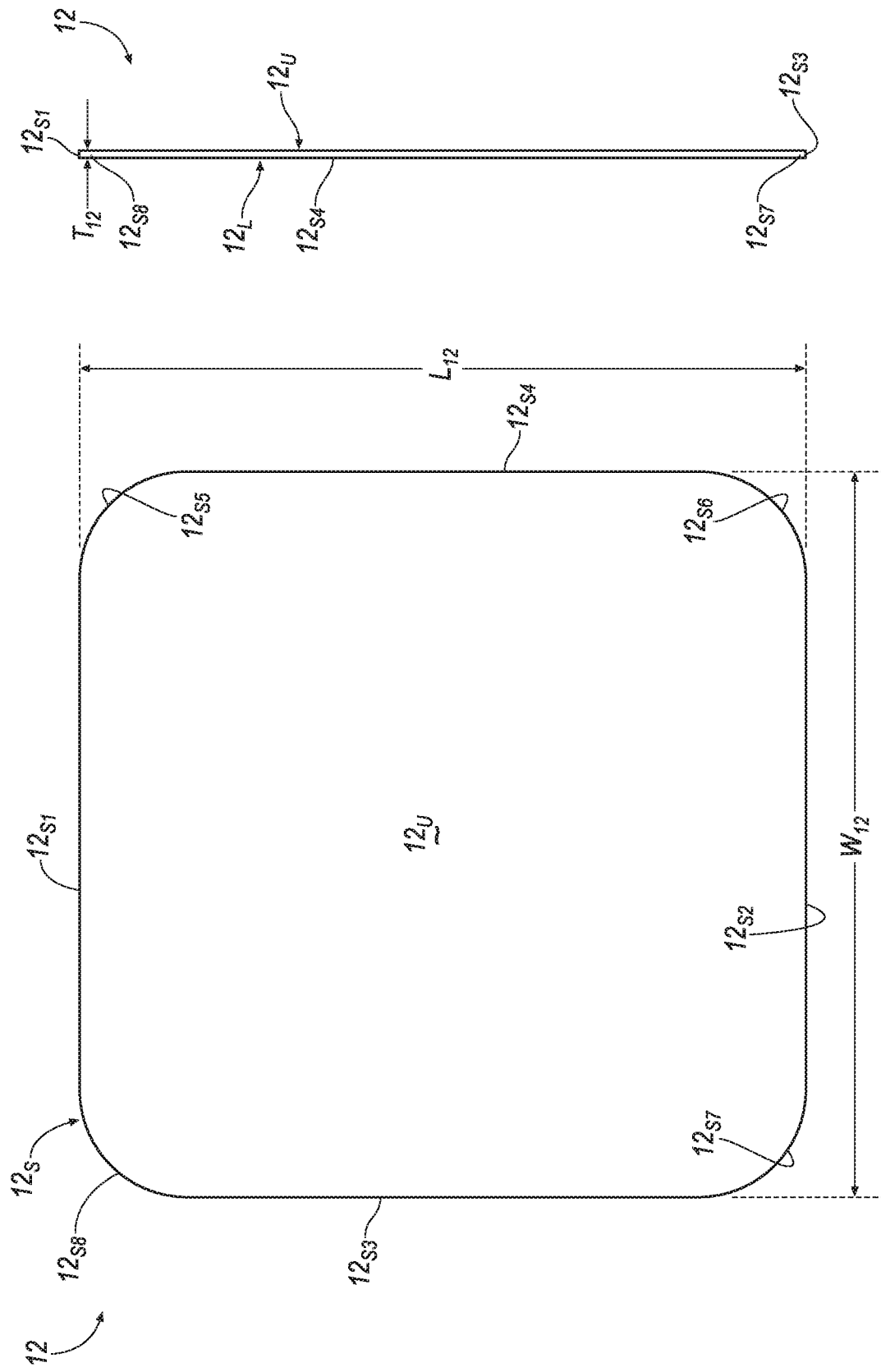

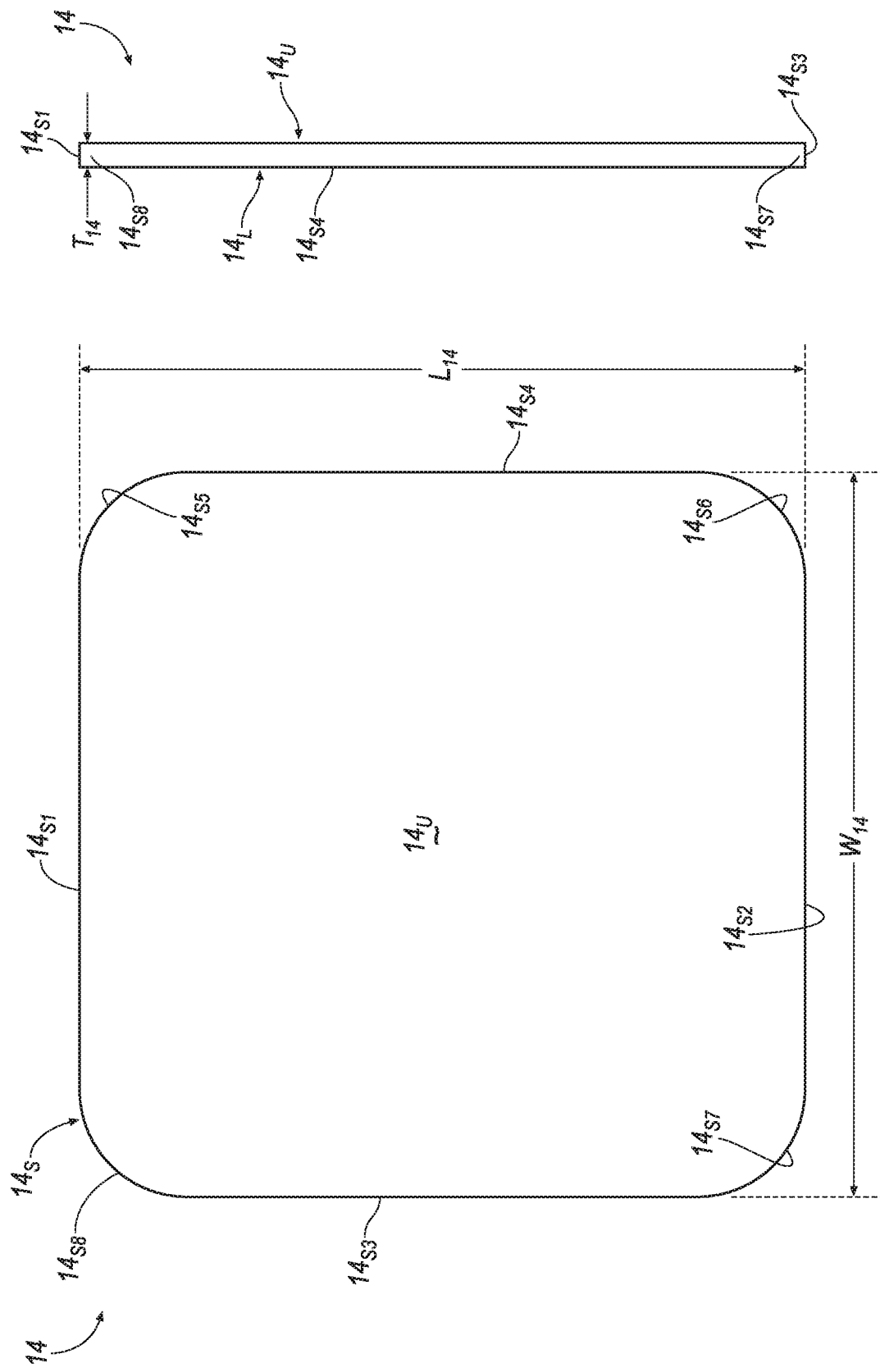

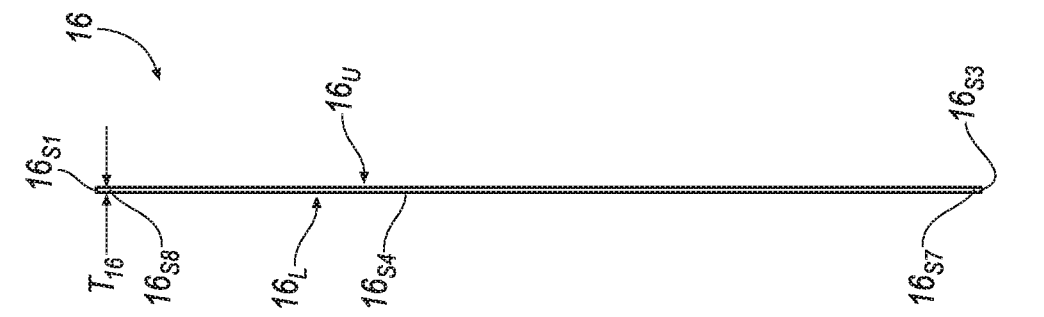
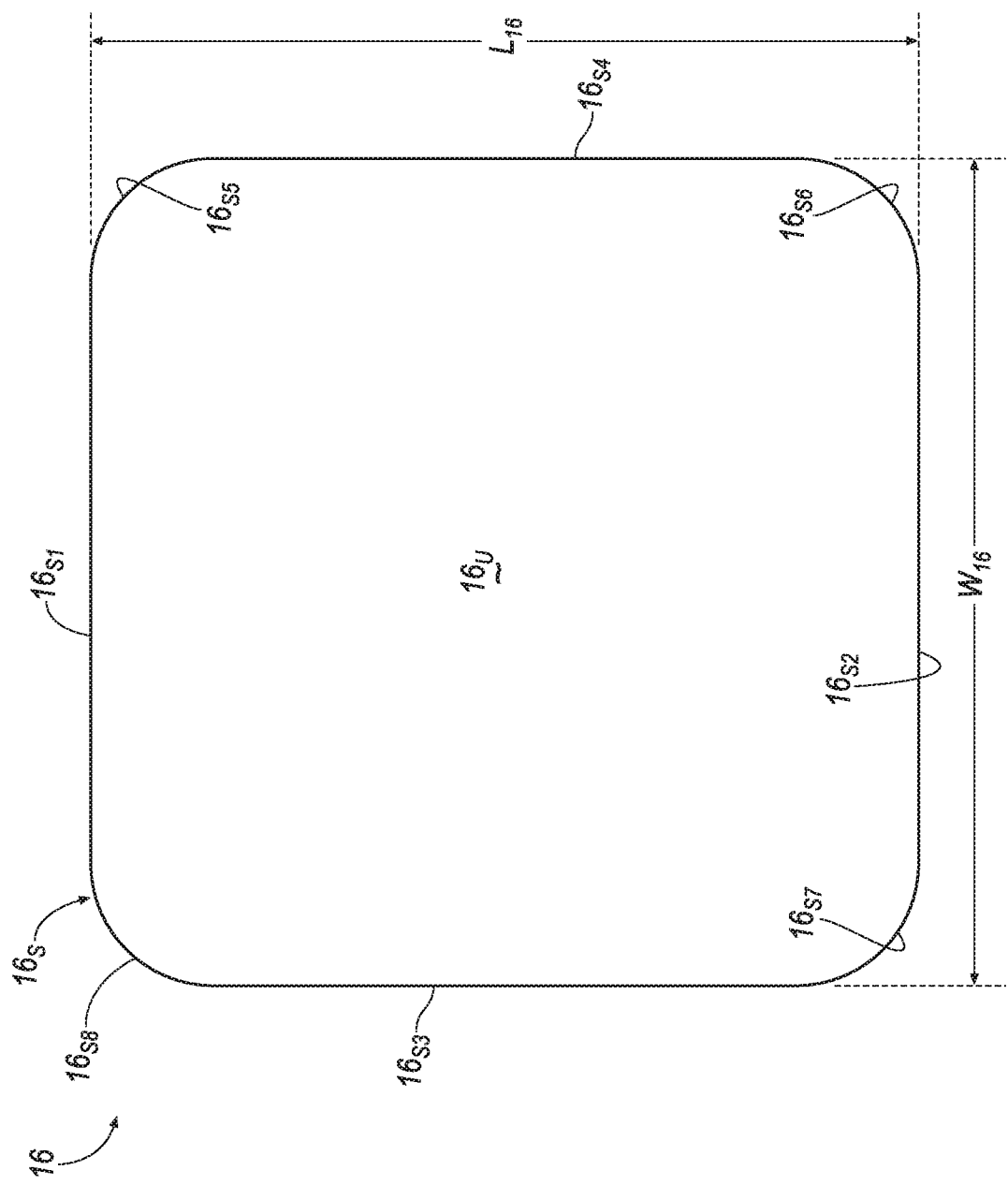

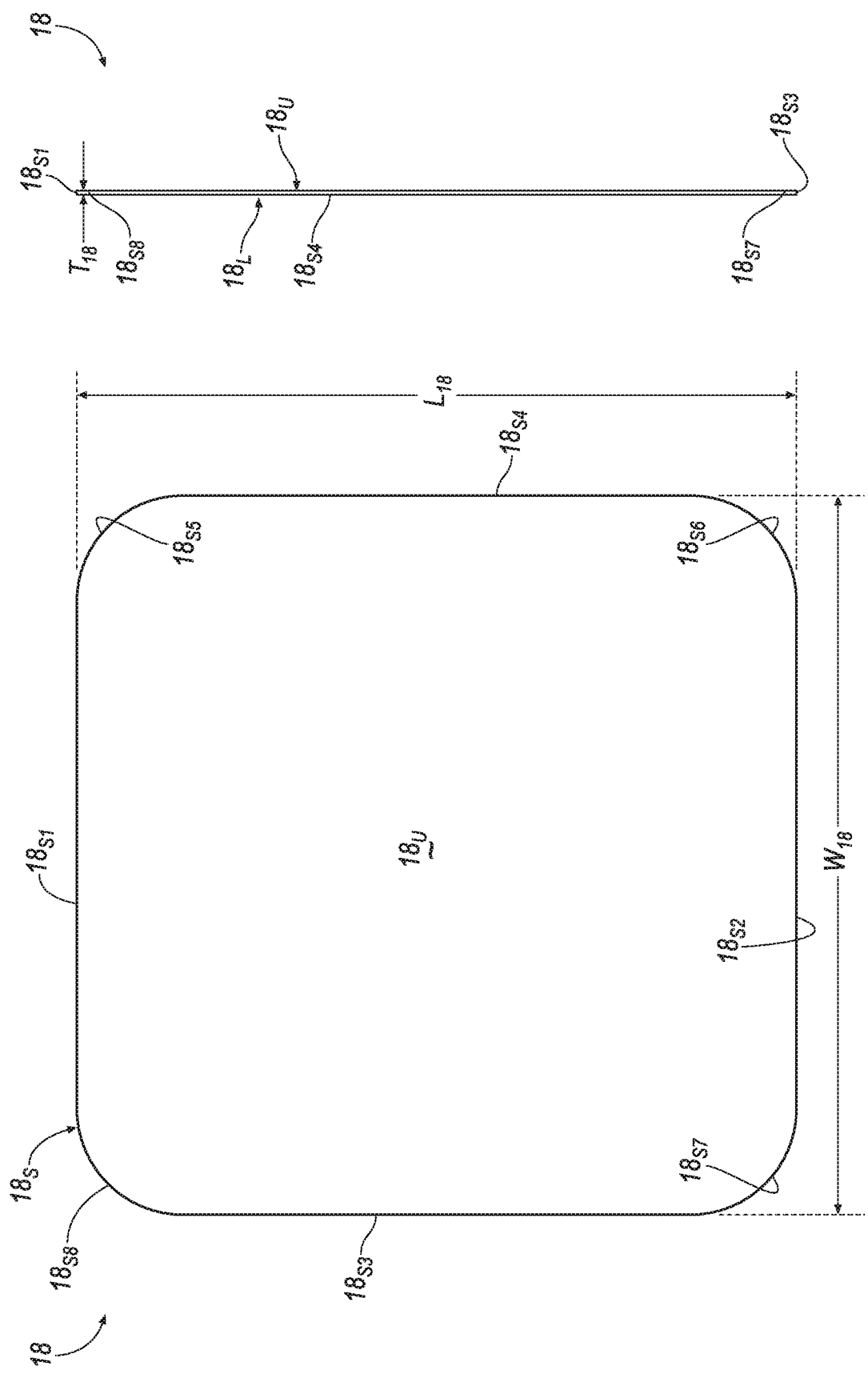

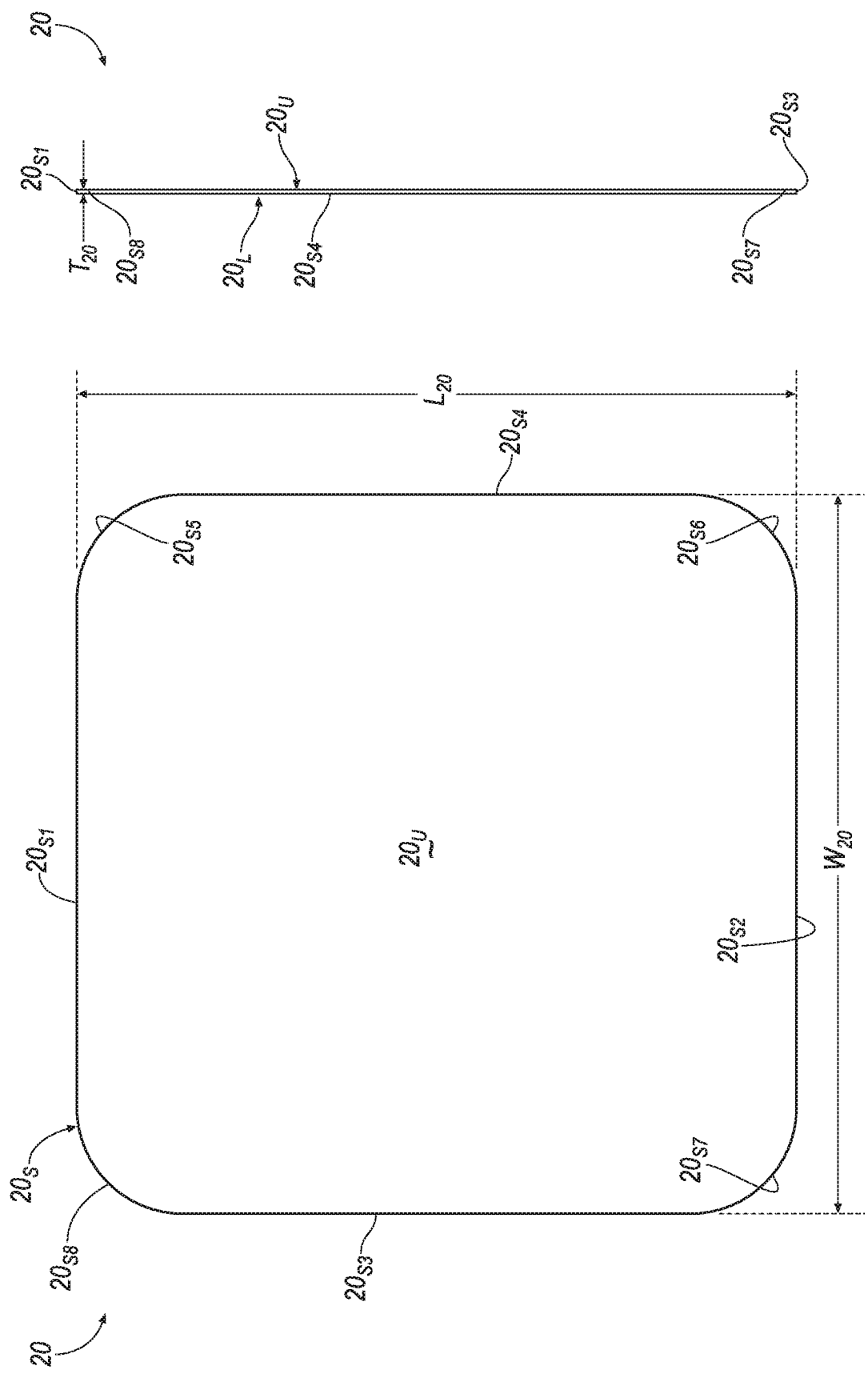

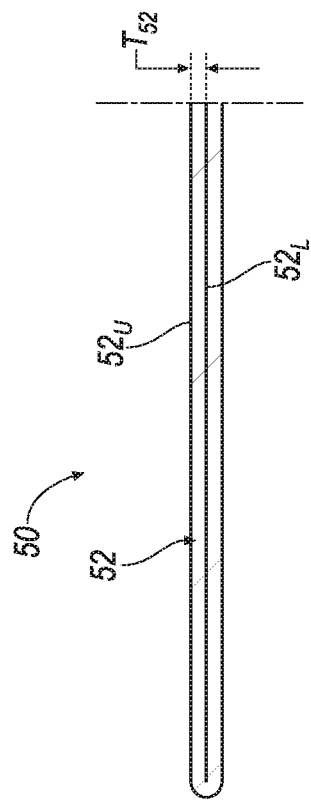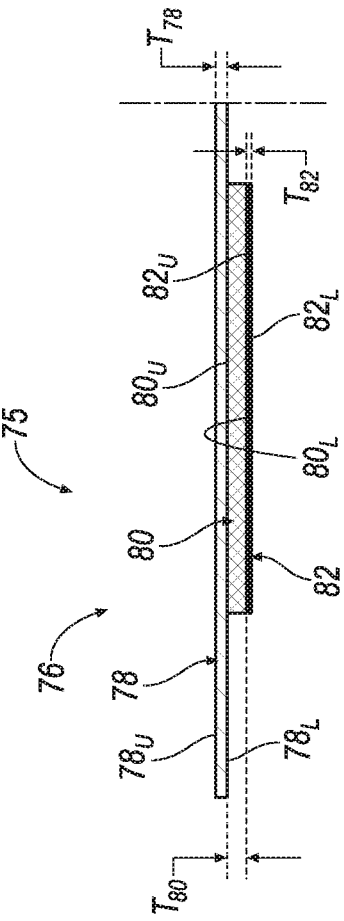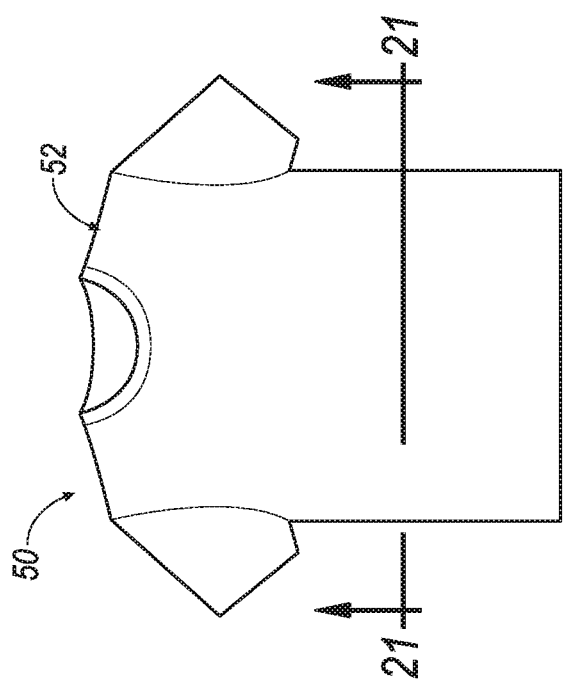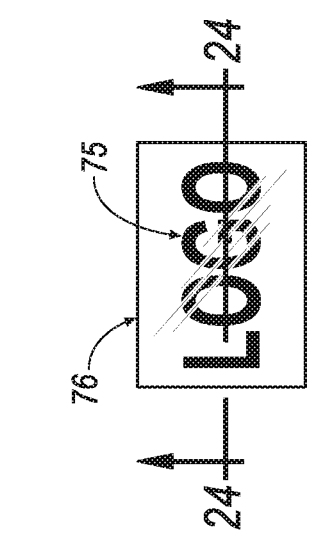

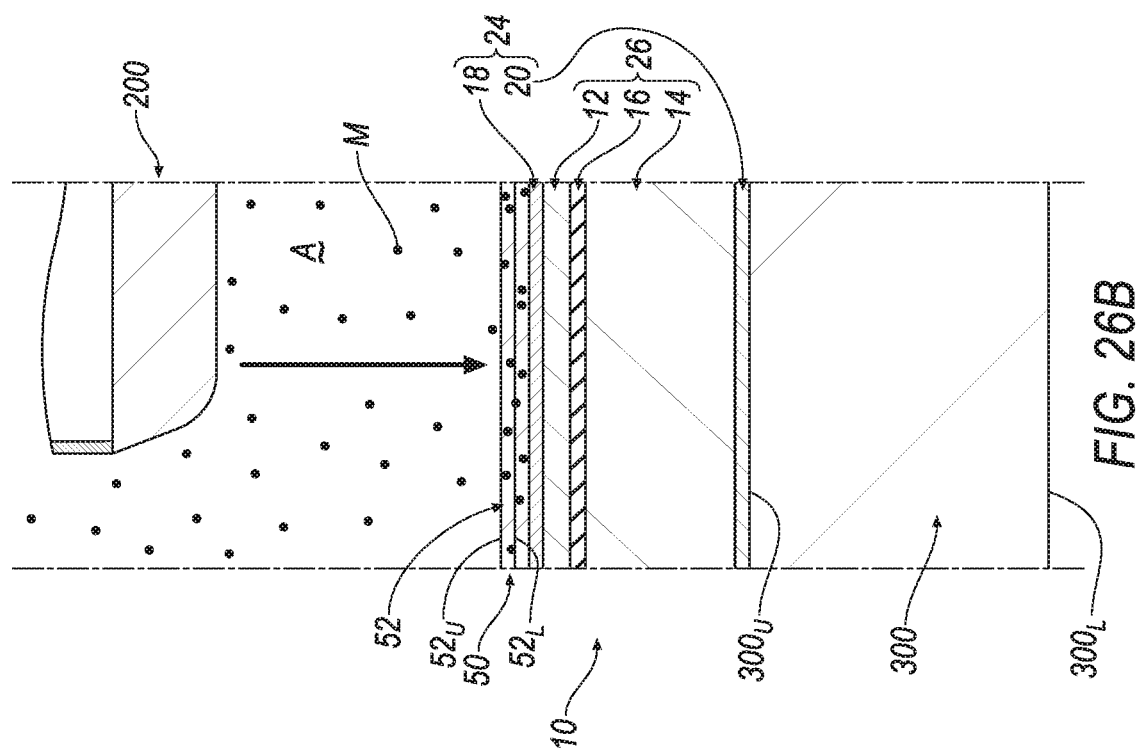
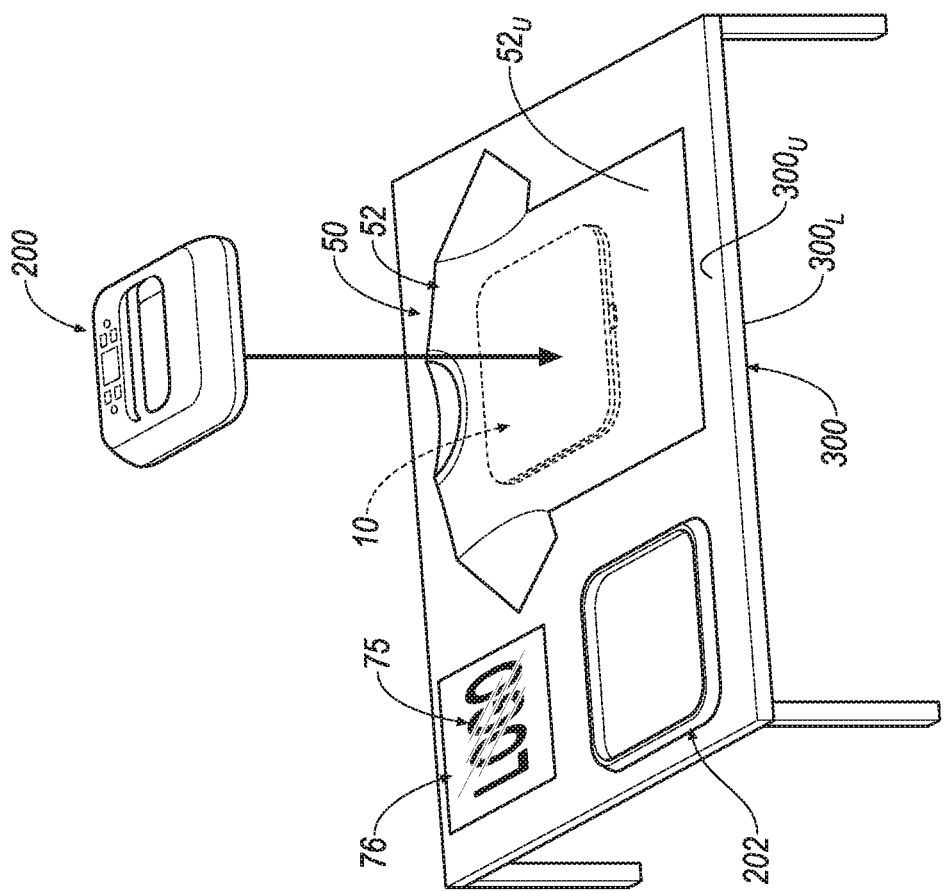
FIG. 25B
FIG. 26B

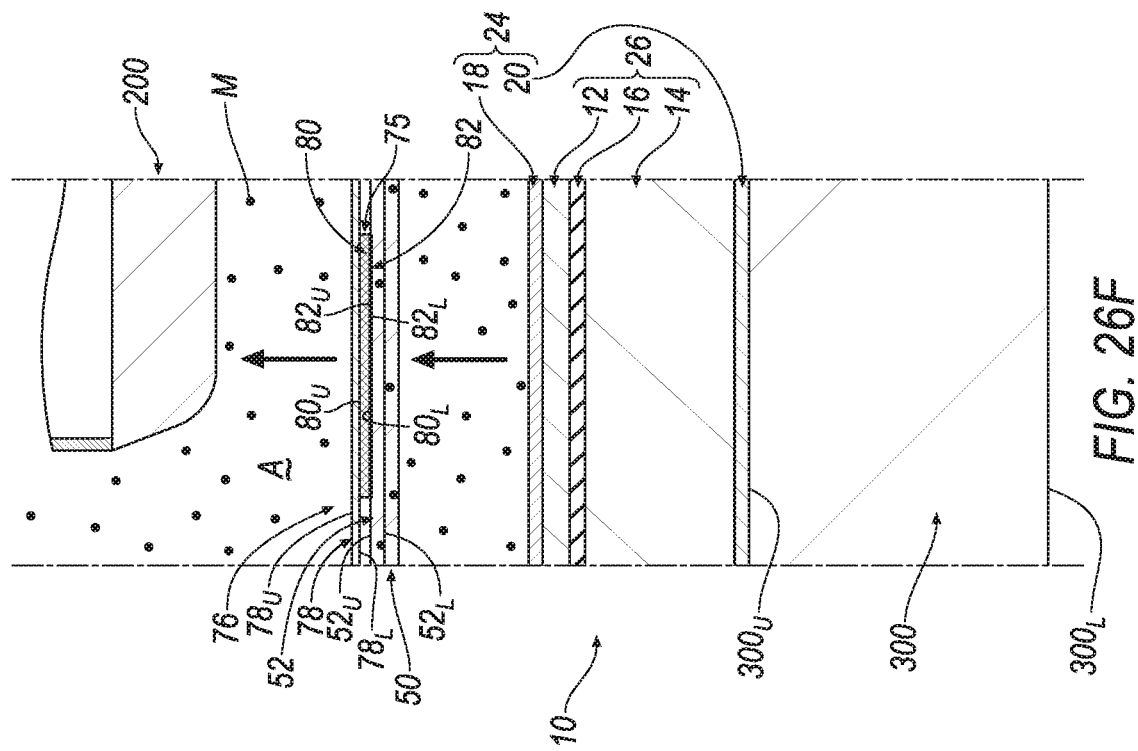
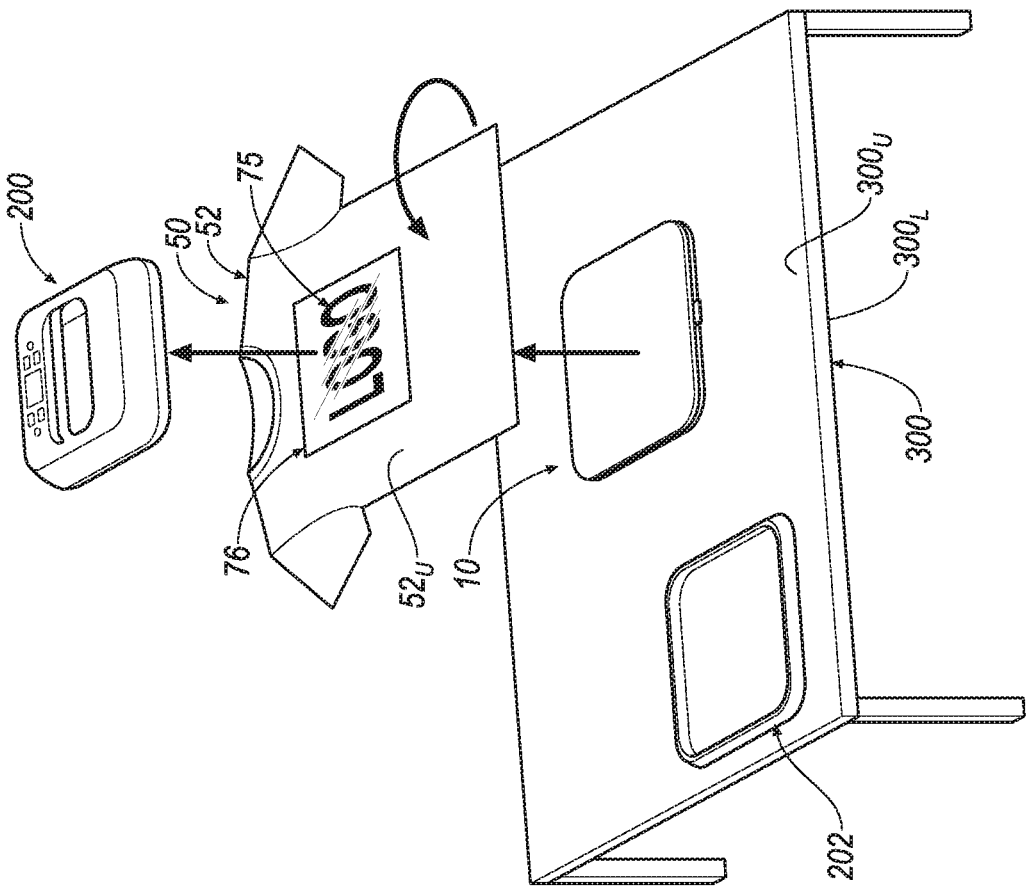

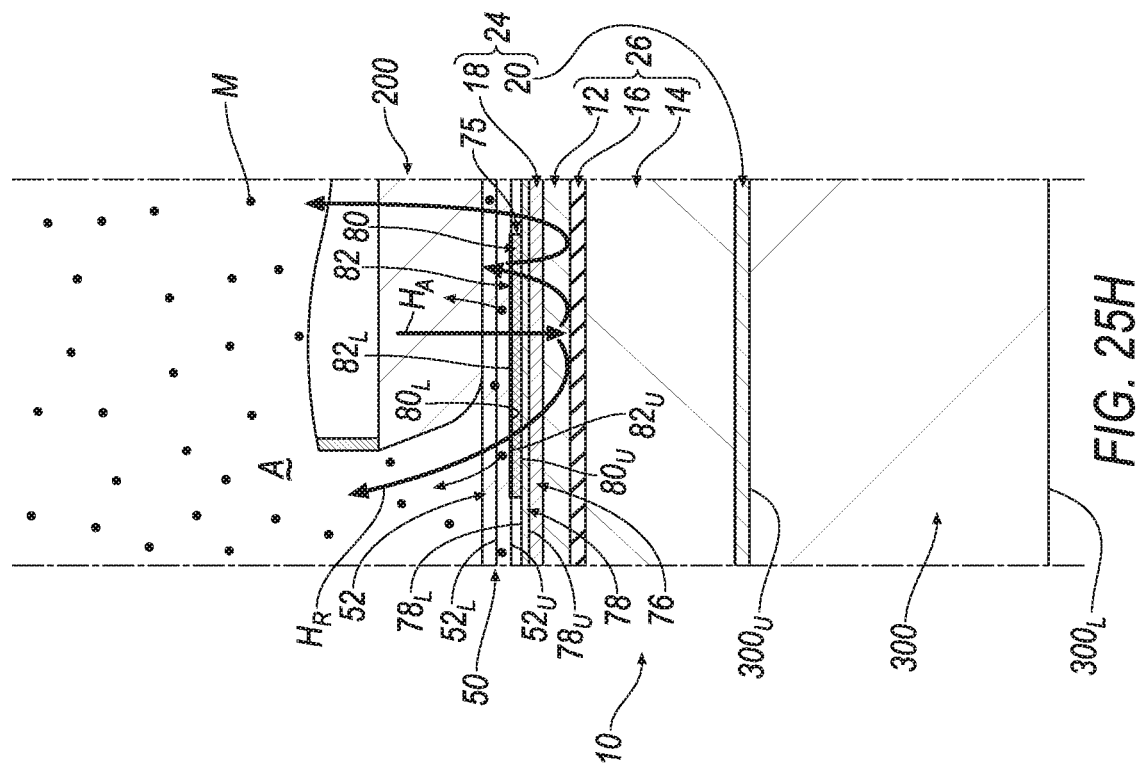
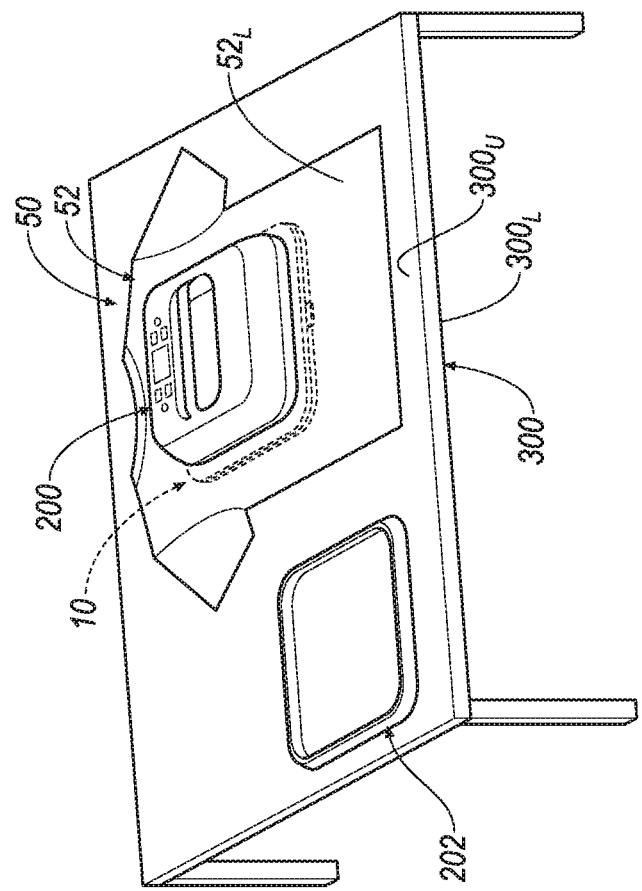
FIG. 25H
FIG. 25H

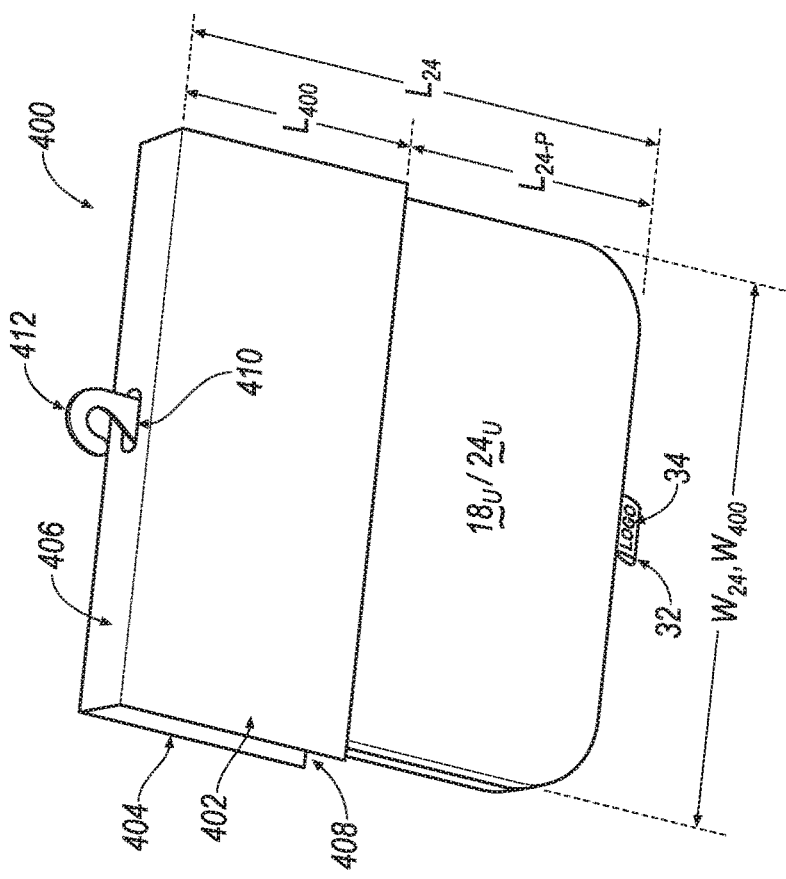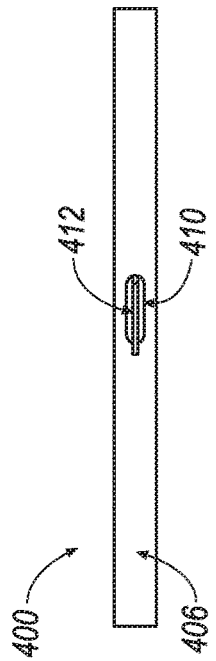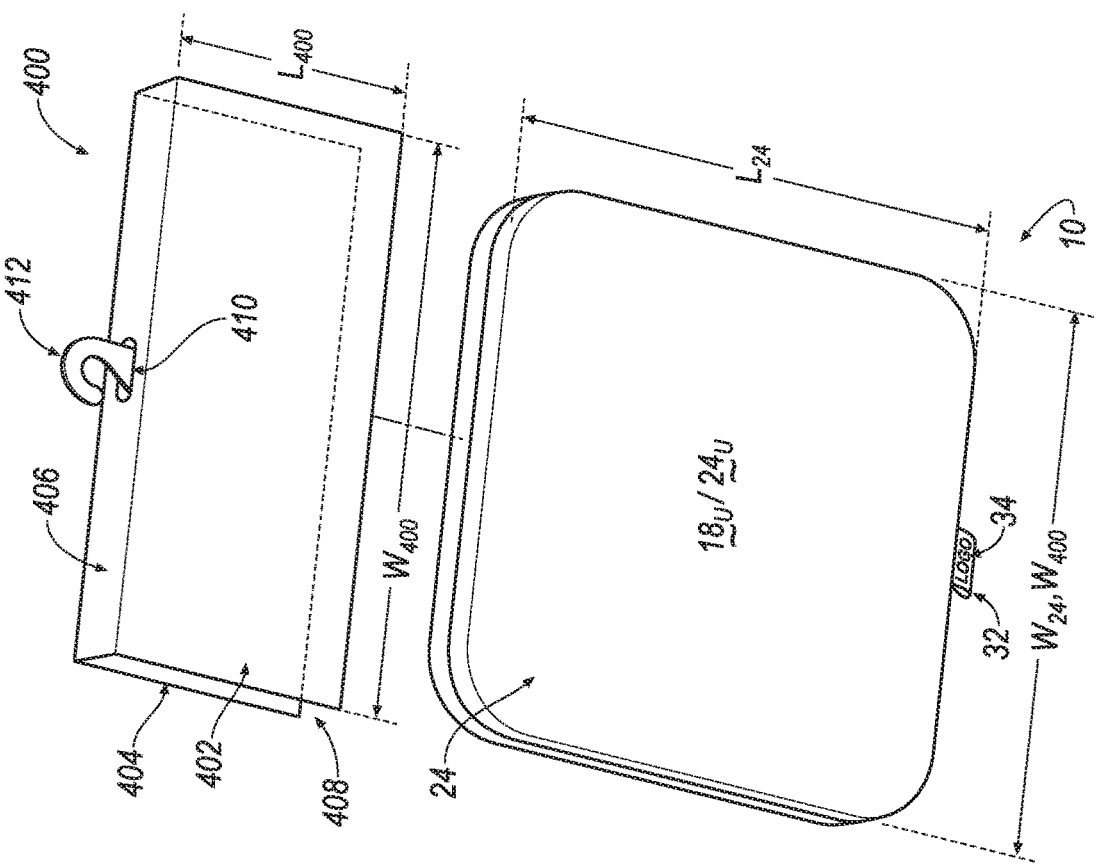
FIG. 28
FIG. 29
FIG. 27

CRAFTING MAT ASSEMBLY, METHOD FOR UTILIZING THE SAME AND PACKAGING ASSEMBLY

TECHNICAL FIELD

The disclosure relates to a crafting mat assembly, a method for utilizing the same and a packaging assembly.

BACKGROUND

Crafting devices and apparatuses are known. While existing crafting devices and apparatuses perform adequately for their intended purpose, improvements to crafting devices and apparatuses are continuously being sought in order to advance the arts.

SUMMARY

One aspect of the disclosure provides an assembly. The assembly includes a crafting mat including a container portion defining a cavity and a layered interior body portion disposed within the cavity. The container portion includes a permeable top layer and an impermeable and insulative bottom layer. The impermeable and insulative bottom layer is connected to the permeable top layer for defining the cavity. The permeable top layer is defined by a thickness ranging from about 0.10 mm to about 1.24 mm. The impermeable and insulative bottom layer is defined by a thickness ranging from about 0.10 mm to about 1.50 mm. The layered interior body portion includes a permeable upper layer, an impermeable and insulative lower layer and an impermeable and heat-reflective intermediate layer. The impermeable and heat-reflective intermediate layer is disposed between the permeable upper layer and the impermeable and insulative lower layer. The permeable upper layer is defined by a thickness ranging from about 1.50 mm to about 7.85 mm. The impermeable and insulative lower layer is defined by a thickness ranging from about 5.00 mm to about 20.00 mm. The impermeable and heat-reflective intermediate layer is defined by a thickness ranging from about 0.15 mm to about 1.25 mm.

Implementations of the disclosure may include one or more of the following optional features. In some implementations, the permeable top layer is configured to permit moisture from a substrate portion and applied heat from a heating device that passed through the substrate portion to pass there-through. The permeable upper layer is configured to permit moisture from the substrate portion and applied heat from the heating device that passed through the substrate portion to pass there-through. The impermeable and heat-reflective intermediate layer is configured to reflect the applied heat as reflected heat back toward and through the substrate portion. The impermeable and insulative lower layer is configured to not permit moisture from the substrate portion to pass there-through. The impermeable and insulative bottom layer is configured to not permit moisture from the substrate portion to pass there-through.

In some implementations, the permeable upper layer, the impermeable and insulative lower layer and the impermeable and heat-reflective intermediate layer are not adhered to one another and are permitted to laterally shift or float relative one another within the cavity of the container portion. In some instances, the permeable top layer includes a cotton material or a metal-sprayed cotton material. In other instances, the permeable upper layer includes a felt material or a polyester felt material. In yet other instances, the impermeable and heat-reflective intermediate layer includes a metallic material or a pre-shrunk metallic material. In some examples, the impermeable and insulative lower layer includes a foam material or a silicon foam material. In other examples, the impermeable and insulative bottom layer includes a polymer material or a polyurethane material.

In some examples, a thickness of the crafting mat is defined by: the thickness of the permeable top layer and the thickness of the impermeable and insulative bottom layer; and a height of the cavity of the container portion. The height of the cavity of the container portion is sized for receiving and approximately equal to the thickness of the permeable upper layer, the thickness of the impermeable and insulative lower layer and the thickness of the impermeable and heat-reflective intermediate layer that defines the layered interior body portion.

In some implementations, the thickness of the crafting mat is defined by a thickness ranging from about 6.85 mm to about 31.84 mm. In other implementations, the thickness of the crafting mat is approximately equal to 12.93 mm.

In some instances, the thickness of the permeable top layer is approximately equal to 0.25 mm. In other instances, the thickness of the permeable upper layer is approximately equal to 2.20 mm. In yet other instances, the thickness of the impermeable and heat-reflective intermediate layer is approximately equal to 0.23 mm. In some examples, the thickness of the impermeable and insulative lower layer is approximately equal to 10.00 mm. In other examples, the thickness of the impermeable and insulative bottom layer is approximately equal to 0.25 mm.

In some examples, the assembly further includes a fastening portion that secures the permeable top layer to the impermeable and insulative bottom layer. In other examples, the assembly includes a tag secured to one or both of the permeable top layer to the impermeable and insulative bottom layer and indicia applied to the tag. In yet other examples, indicia is applied to one or both of the permeable top layer and the impermeable and insulative bottom layer.

Another aspect of the disclosure provides an assembly. The assembly includes a crafting mat including a container portion defining a cavity and a layered interior body portion disposed within the cavity. The container portion includes a top layer and a bottom layer. The bottom layer is connected to the top layer for defining the cavity. The layered interior body portion includes an upper layer, a lower layer and an intermediate layer disposed between the upper layer and the lower layer.

Implementations of the disclosure may include one or more of the following optional features. In some implementations, the top layer is configured to permit moisture from a substrate portion and applied heat from a heating device that passed through the substrate portion to pass there-through. The upper layer is configured to permit moisture from the substrate portion and applied heat from the heating device that passed through the substrate portion to pass there-through. The intermediate layer is configured to reflect the applied heat as reflected heat back toward and through the substrate portion. The lower layer is configured to not permit moisture from the substrate portion to pass there-through. The bottom layer is configured to not permit moisture from the substrate portion to pass there-through.

In some instances, the upper layer, the lower layer and the intermediate layer are not adhered to one another and are permitted to laterally shift or float relative one another within the cavity of the container portion. In some examples, the top layer is permeable. In other examples, the bottom layer is impermeable and insulative. In yet other examples, the upper layer is permeable. In other instances, the lower layer is impermeable and insulative. In yet other instances, the intermediate layer is impermeable and heat-reflective.

In some instances, the top layer includes a cotton material or a metal-sprayed cotton material. In other instances, the upper layer includes a felt material or a polyester felt material. In yet other instances, the intermediate layer includes a metallic material or a pre-shrunk metallic material. In some examples, the lower layer includes a foam material or a silicon foam material. In other examples, the bottom layer includes a polymer material or a polyurethane material.

In some implementations, a thickness of the crafting mat is defined by: the thickness of the top layer and the thickness of the bottom layer; and a height of the cavity of the container portion. The height of the cavity of the container portion is sized for receiving and approximately equal to the thickness of the upper layer, the thickness of the lower layer and the thickness of the intermediate layer that defines the layered interior body portion. In some implementations, the top layer is defined by a thickness ranging from about 0.10 mm to about 1.24 mm. In other implementations, the upper layer is defined by a thickness ranging from about 1.50 mm to about 7.85 mm. In yet other implementations, the intermediate layer is defined by a thickness ranging from about 0.15 mm to about 1.25 mm. In some implementations, the lower layer is defined by a thickness ranging from about 5.00 mm to about 20.00 mm. In other implementations, the bottom layer is defined by a thickness ranging from about 0.10 mm to about 1.50 mm.

In some examples, the thickness of the crafting mat is defined by a thickness ranging from about 6.85 mm to about 31.84 mm. In other examples, the thickness of the crafting mat is approximately equal to 12.93 mm. In some implementations, the thickness of the top layer is approximately equal to 0.25 mm. In other implementations, the thickness of the upper layer is approximately equal to 2.20 mm. In yet other implementations, the thickness of the intermediate layer is approximately equal to 0.23 mm. In some instances, the thickness of the lower layer is approximately equal to 10.00 mm. In other instances, the thickness of the bottom layer is approximately equal to 0.25 mm.

In some examples, the assembly further includes a fastening portion that secures the top layer to the bottom layer. In other examples, the assembly includes a tag secured to one or both of the top layer to the bottom layer and indicia applied to the tag. In yet other examples, indicia is applied to one or both of the top layer and the bottom layer.

Yet another aspect of the disclosure provides a method. The method includes: arranging a crafting mat assembly upon a support member; arranging a substrate portion upon the crafting mat assembly; arranging a design portion adjacent the substrate portion; arranging a heating device adjacent the design portion; directing heat from the heating device through the design portion, the substrate portion and partially through upstream layers but not through downstream layers of the crafting mat assembly such that a first layer of the downstream layers reflects the heat from the heating device back through the upstream layers and the substrate portion and the design portion.

Implementations of the disclosure may include one or more of the following optional features. In some implementations, the method includes utilizing one or both of the heat from the heating device and the reflected heat for evaporating moisture from the substrate portion. In some implementations, the method includes heating an adhesive layer of the design portion for attaching a base portion of the design portion to the substrate portion. In other implementations, the method includes removing a film layer of the design portion from the base portion of the design portion.

Another aspect of the disclosure provides a packaging assembly. The packaging assembly includes a crafting mat and packaging. The packaging includes a plurality of flap portions that are arranged for defining a crafting mat-receiving cavity that is sized for receiving a thickness of the crafting mat. The crafting mat is disposed within the crafting mat-receiving cavity.

Implementations of the disclosure may include one or more of the following optional features. In some implementations, the plurality of flap portions are defined by a length and a width. The crafting mat is defined by a length and a width. The width of at least one flap portion of the plurality of flap portions is approximately equal to or slightly greater than the width of the crafting mat. The length of at least one flap portion of the plurality of flap portions is less than the length of the crafting mat such that at least a portion of an exterior surface of the crafting mat is not enclosed or covered by the packaging.

In some implementations, the plurality of flap portions defines a C-shaped or U-shaped body. In other implementations, one of the plurality of flap portions defines a passage. In yet other implementations, the packaging further includes a hook that extends through the passage.

In some examples, the crafting mat includes a container portion defining a cavity and a layered interior body portion disposed within the cavity. The container portion includes a top layer and a bottom layer connected to the top layer for defining the cavity. The layered interior body portion includes an upper layer, a lower layer, and an intermediate layer disposed between the upper layer and the lower layer.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 is a front perspective view of an exemplary assembly.

FIG. 2 is a rear perspective view of the assembly of FIG. 1.

FIG. 3 is an exploded perspective view of the assembly of FIG. 1.

FIG. 5 is a front view of an upper layer of the assembly of FIG. 1.

FIG. 6 is a side view of the upper layer of FIG. 5.

FIG. 7 is a front view of a lower layer of the assembly of FIG. 1.

FIG. 8 is a side view of the lower layer of FIG. 7.

FIG. 9 is a front view of an intermediate layer of the assembly of FIG. 1.

FIG. 10 is a side view of the intermediate layer of FIG. 9.

FIG. 11 is a front view of a top layer of the assembly of FIG. 1.

FIG. 12 is a side view of the top layer of FIG. 11.

FIG. 13 is a front view of a bottom layer of the assembly of FIG. 1.

FIG. 14 is a side view of the bottom layer of FIG. 13.

FIG. 20 is a front view of a substrate portion of a crafted object.

FIG. 21 is a cross-sectional view of the substrate portion according to line 21-21 of FIG. 20.

FIG. 23 is a front view of the multilayer body including the design portion of FIG. 22.

FIG. 24 is a cross-sectional view of the multilayer body including the design portion according to line 24-24 of FIG. 23.

FIGS. 25A-25K illustrate perspective views associated with a method of utilizing the assembly of FIG. 1 in conjunction with the substrate portion of FIGS. 20-21, the multilayer body including the design portion of FIGS. 22-24, a heating device and a support member.

FIGS. 26A-26K illustrate cross-sectional views associated with the perspective views associated with the method of utilizing the assembly of FIGS. 25A-25K.

FIG. 27 is an exploded view of a packaging assembly including packaging and the assembly of FIG. 1.

FIG. 28 is an assembled view of the packaging assembly of FIG. 27.

FIG. 29 is an end view of the packaging of FIGS. 27 and 28.

Like reference symbols in the various drawings indicate like elements.

DETAILED DESCRIPTION

The figures illustrate exemplary implementations of crafting mat assembly, a method for utilizing the same and a packaging assembly. Based on the foregoing, it is to be generally understood that the nomenclature used herein is simply for convenience and the terms used to describe the invention should be given the broadest meaning by one of ordinary skill in the art.

Referring to FIGS. 1-3 and 15-19 an assembly is shown generally at 10. The assembly 10 may be alternatively referred to as a crafting mat, a crafting pad, a crafting cushion or the like. As will be described in greater detail in the following disclosure at FIGS. 25A-25K and 26A-26K, the assembly 10 may be utilized in the process of preparing a crafted object 100 (see, e.g., FIGS. 25K and 26K) that includes a substrate portion 50 (see also, e.g., FIGS. 20 and 21) and a design portion 75 (see also, e.g., FIGS. 22-24).

Figure 4:
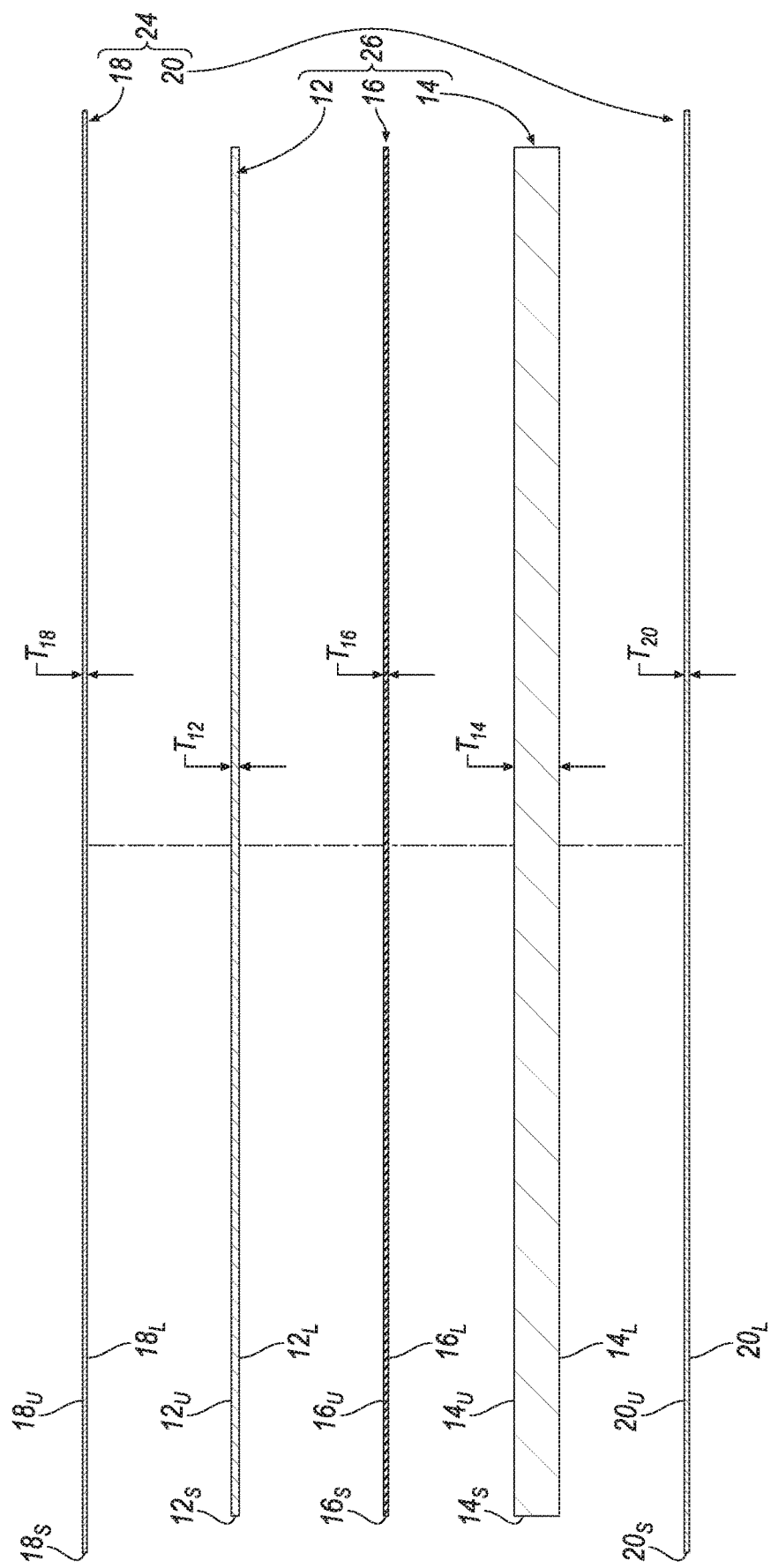
FIG. 4 is an exploded cross-sectional view of the assembly of FIG. 1.
Figure 17:
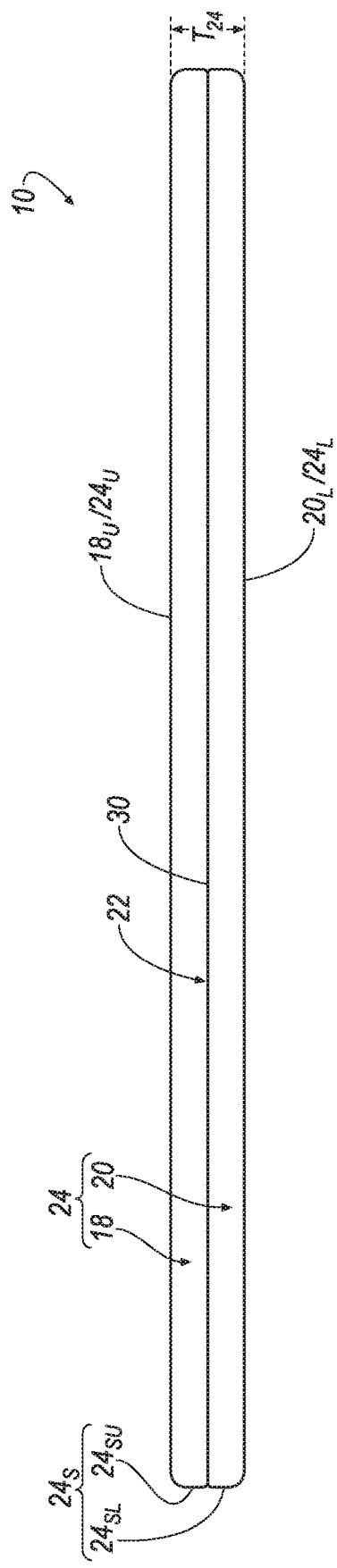
FIG. 17 is a side view of the assembly according to arrow 17 of FIGS. 15 and 15.
Figure 18:
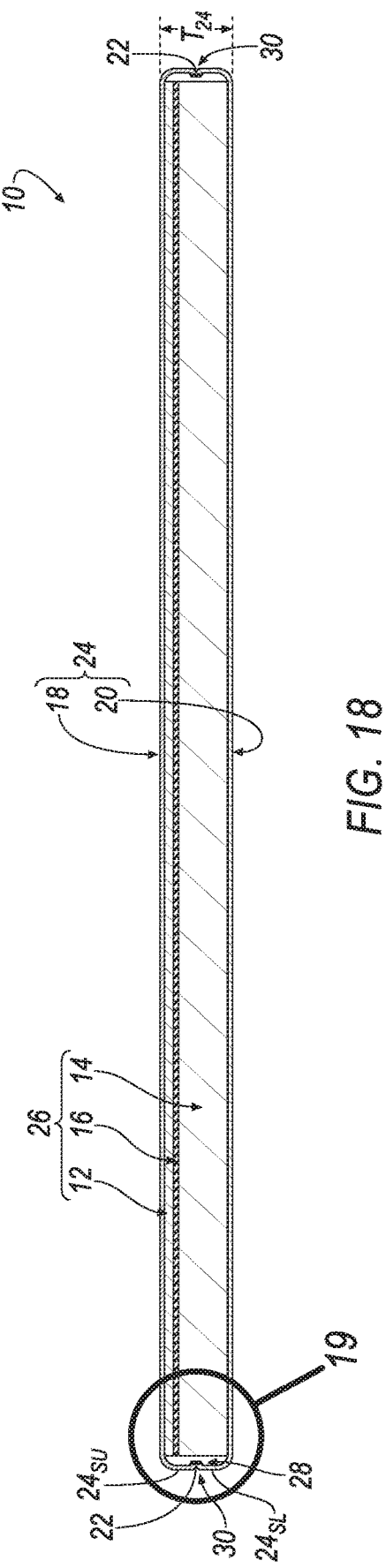
FIG. 18 is a cross-sectional view of the assembly according to line 18-18 of FIG. 1.
Figure 19:
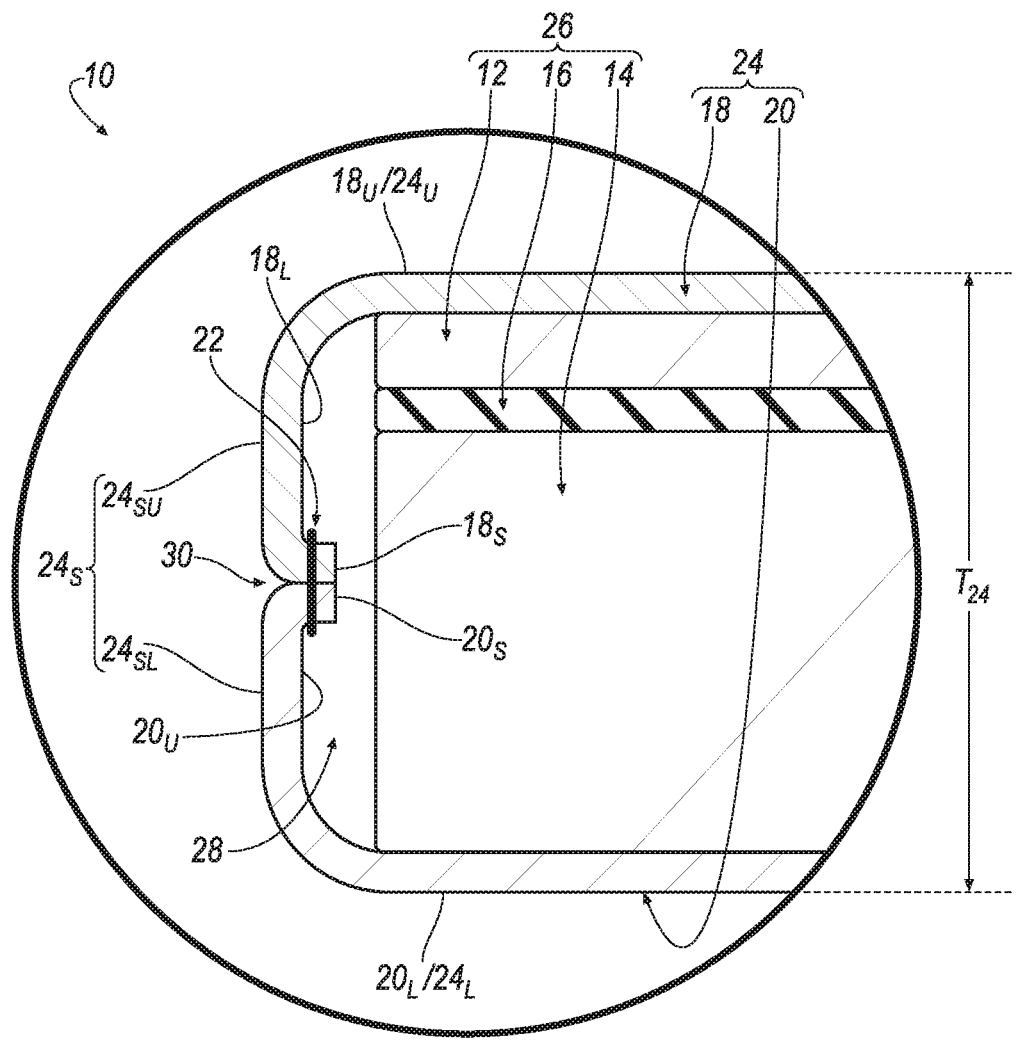
FIG. 19 is an enlarged view according to line 19 of FIG. 18.

Referring to FIGS. 3-4, the assembly 10 includes a first plurality of layers 12-16 and a second plurality of layers 18-20. The first plurality of layers 12-16 include an upper layer 12 (see also, e.g., FIGS. 5-6), a lower layer 14 (see also, e.g., FIGS. 7-8) and an intermediate layer 16 (see also, e.g., FIGS. 9-10) disposed between the upper layer 12 and the lower layer 14. The second plurality of layers 18-20 include top layer 18 (see also, e.g., FIGS. 11-12) and a bottom layer 20 (see also, e.g., FIGS. 13-14). As also seen at FIG. 3, the assembly 10 also includes a fastening portion 22 (e.g. thread). With reference to FIGS. 15-19, the assembly 10 is yet further formed by utilizing the fastening portion 22 for securing the top layer 18 to the bottom layer 20. As also seen at FIGS. 15-19, the top layer 18, the bottom layer 20 and the fastening portion 22 define a container portion 24 of the assembly 10 that contains a layered interior body portion 26 (see, e.g., FIGS. 18 and 19) defined by the first plurality of layers 12-16 that includes the upper layer 12, the lower layer 14 and the intermediate layer 16. With reference to FIGS. 18-19, the container portion 24 defines a chamber or cavity 28 that is sized for containing the layered interior body portion 26.

With reference to FIGS. 4-6, the upper layer 12 includes an upper surface $12_U$, a lower surface $12_L$ and a side surface $12_S$ connecting the upper surface $12_U$ to the lower surface $12_L$. With reference to FIGS. 4 and 7-8, the lower layer 14 includes an upper surface $14_U$, a lower surface $14_L$ and a side surface $14_S$ connecting the upper surface $14_U$ to the lower surface $14_L$. With reference to FIGS. 4 and 9-10, the intermediate layer 16 includes an upper surface $16_U$, a lower surface $16_L$ and a side surface $16_S$ connecting the upper surface $16_U$ to the lower surface $16_L$.

As seen at FIGS. 3-4, the layered interior body portion 26 of the assembly 10 is formed by arranging or disposing the lower surface $12_L$ of the upper layer 12 over or adjacent the upper surface $16_U$ of the intermediate layer 16. The layered interior body portion 26 of assembly 10 is further formed by arranging or disposing the upper surface $14_U$ of the lower layer 14 over or adjacent the lower surface $16_L$ of the intermediate layer 16. In an example, the upper layer 12, the lower layer 14 and the intermediate layer 16 are not adhered to one another (i.e., they are stacked upon one another as described above and contained within the cavity 28 of the container portion 24 such that the layers 12-16 are permitted to, for example, laterally shift or float relative one another during use of the assembly 10 as described below at FIGS. 25A-25K and 26A-26K). The lateral shifting or floating of the layers 12-16 permits air to surround each of the upper layer 12, the lower layer 14 and the intermediate layer 16 and thereby permits each of the upper layer 12, the lower layer 14 and the intermediate layer 16 to expand (and subsequently cool) at different rates when heat (see, e.g., $H_A$ at FIGS. 26C, 26E, 26H) is applied thereto by a heating device (see, e.g., heating device 200 at FIGS. 25A-25K).

Referring to FIGS. 4-6, the upper layer 12 is defined by a thickness $T_{12}$ extending between the upper surface $12_U$ and the lower surface $12_L$. As will be described in the following disclosure at FIGS. 25A-25K and 26A-26K, a selected material of the upper layer 12 and the thickness $T_{12}$ of the upper layer 12 contributes to an optimization of the performance of the utilization of the assembly 10. Therefore, the skilled artisan will understand that a selected material and thickness $T_{12}$ of the upper layer 12 is not an obvious design choice that contributes to the design of the assembly 10.

As seen at FIG. 5, in some configurations, the side surface $12_S$ includes four side surface portions $12_{S1}$, $12_{S2}$, $12_{S3}$, $12_{S4}$. The side surface $12_S$ may optionally include arcuate corner side surface portions $12_{S5}$, $12_{S6}$, $12_{S7}$, $12_{S8}$ that connect adjacent side surface portions of the four side surface portions $12_{S1}$, $12_{S2}$, $12_{S3}$, $12_{S4}$.

With continued reference to FIG. 5, the upper layer 12 is further defined by a length $L_{12}$ and a width $W_{12}$. The length $L_{12}$ extends between the first side surface portion $12_{S1}$ and the second side surface portion $12_{S2}$. The width $W_{12}$ extends between the third side surface portion $12_{S3}$ and the fourth side surface portion $12_{S4}$. In some instances, the length $L_{12}$ may be approximately equal to the width $W_{12}$, and, as such, the upper layer 12 may generally define a square shape. However, in other configurations, the length $L_{12}$ may not be equal to the width $W_{12}$, and, as such, the upper layer 12 may generally define a rectangular shape. In other configurations, the side surface $12_S$ may include less than four sides or more than four sides such that the upper layer 12 may define any desirable shape, pattern, geometry or the like.

In some examples, the thickness $T_{12}$ of the upper layer 12 may be defined by a thickness ranging from a thickness of about 1.50 mm to a thickness of about 7.85 mm. In further examples, the thickness $T_{12}$ of the upper layer 12 may be defined by a thickness ranging from a thickness of about 2.35 mm to a thickness of about 3.35 mm. In yet further examples, the thickness $T_{12}$ of the upper layer 12 may be defined by a thickness ranging from a thickness of about 2.60 mm to a thickness of about 3.10 mm. In some instances, the thickness $T_{12}$ of the upper layer 12 may be defined by a thickness approximately equal to about 2.85 mm. In other instances, the thickness $T_{12}$ of the upper layer 12 may be defined by a thickness approximately equal to about 2.20 mm.

In some examples, the length $L_{12}$ of the upper layer 12 may be defined by a length ranging from a length of about 200.00 mm to a length of about 550.00 mm. In further examples, the length $L_{12}$ of the upper layer 12 may be defined by a length ranging from, for example: (1) a length of about 248.00 mm to a length of about 260.00 mm; (2) a length of about 298.8 mm to a length of about 310.80 mm; (3) a length of about 400.40 mm to a length of about 412.40 mm; or (4) a length of about 502.00 mm to a length of about 514.00 mm. In yet further examples, the length $L_{12}$ of the upper layer 12 may be defined by a length ranging from, for example: (1) a length of about 251.00 mm to a length of about 257.00 mm; (2) a length of about 301.8 mm to a length of about 307.80 mm; (3) a length of about 403.40 mm to a length of about 409.40 mm; or (4) a length of about 505.00 mm to a length of about 511.00 mm. In some examples, the length $L_{12}$ of the upper layer 12 may be defined by a length approximately equal to about 254.00 mm. In some instances, the length $L_{12}$ of the upper layer 12 may be defined by a length approximately equal to about 304.80 mm. In other instances, the length $L_{12}$ of the upper layer 12 may be defined by a length approximately equal to about 406.40 mm. In yet instances, the length $L_{12}$ of the upper layer 12 may be defined by a length approximately equal to about 508.00 mm.

In some examples, the width $W_{12}$ of the upper layer 12 may be defined by a width ranging from a width of about 200.00 mm to a width of about 550.00 mm. In further examples, the width $W_{12}$ of the upper layer 12 may be defined by a width ranging from, for example: (1) a width of about 248.00 mm to a width of about 260.00 mm; (2) a width of about 298.8 mm to a width of about 310.80 mm; (3) a width of about 400.40 mm to a width of about 412.40 mm; or (4) a width of about 502.00 mm to a width of about 514.00 mm. In yet further examples, the width $W_{12}$ of the upper layer 12 may be defined by a width ranging from, for example: (1) a width of about 251.00 mm to a width of about 257.00 mm; (2) a width of about 301.8 mm to a width of about 307.80 mm; (3) a width of about 403.40 mm to a width of about 409.40 mm; or (4) a width of about 505.00 mm to a width of about 511.00 mm. In some examples, the width $W_{12}$ of the upper layer 12 may be defined by a width approximately equal to about 254.00 mm. In some instances, the width $W_{12}$ of the upper layer 12 may be defined by a width approximately equal to about 304.80 mm. In other instances, the width $W_{12}$ of the upper layer 12 may be defined by a width approximately equal to about 406.40 mm. In yet instances, the width $W_{12}$ of the upper layer 12 may be defined by a width approximately equal to about 508.00 mm.

Referring to FIGS. 4 and 7-8, the lower layer 14 is defined by a thickness $T_{14}$ extending between the lower surface $14_U$ and the lower surface $14_L$. As will be described in the following disclosure at FIGS. 25A-25K and 26A-26K, a selected material of the lower layer 14 and the thickness $T_{14}$ of the lower layer 14 contributes to an optimization of the performance of the utilization of the assembly 10. Therefore, the skilled artisan will understand that a selected material and thickness $T_{14}$ of the lower layer 14 is not an obvious design choice that contributes to the design of the assembly 10.

As seen at FIG. 7, in some configurations, the side surface $14_S$ includes four side surface portions $14_{S1}$, $14_{S2}$, $14_{S3}$, $14_{S4}$. The side surface $14_S$ may optionally include arcuate corner side surface portions $14_{S5}$, $14_{S6}$, $14_{S7}$, $14_{S8}$ that connect adjacent side surface portions of the four side surface portions $14_{S1}$, $14_{S2}$, $14_{S3}$, $14_{S4}$.

With continued reference to FIG. 7, the lower layer 14 is further defined by a length $L_{14}$ and a width $W_{14}$. The length $L_{14}$ extends between the first side surface portion $14_{S1}$ and the second side surface portion $14_{S2}$. The width $W_{14}$ extends between the third side surface portion $14_{S3}$ and the fourth side surface portion $14_{S4}$. In some instances, the length $L_{14}$ may be approximately equal to the width $W_{14}$, and, as such, the lower layer 14 may generally define a square shape. However, in other configurations, the length $L_{14}$ may not be equal to the width $W_{14}$, and, as such, the lower layer 14 may generally define a rectangular shape. In other configurations, the side surface $14_S$ may include less than four sides or more than four sides such that the lower layer 14 may define any desirable shape, pattern, geometry or the like.

In some examples, the thickness $T_{14}$ of the lower layer 14 may be defined by a thickness ranging from a thickness of about 5.00 mm to a thickness of about 20.00 mm. In further examples, the thickness $T_{14}$ of the lower layer 14 may be defined by a thickness ranging from a thickness of about 9.50 mm to a thickness of about 10.50 mm. In yet further examples, the thickness $T_{14}$ of the lower layer 14 may be defined by a thickness ranging from a thickness of about 9.75 mm to a thickness of about 10.25 mm. In some instances, the thickness $T_{14}$ of the lower layer 14 may be defined by a thickness approximately equal to about 10.00 mm.

In some examples, the length $L_{14}$ of the lower layer 14 may be defined by a length ranging from a length of about 200.00 mm to a length of about 550.00 mm. In further examples, the length $L_{14}$ of the lower layer 14 may be defined by a length ranging from, for example: (1) a length of about 248.00 mm to a length of about 260.00 mm; (2) a length of about 298.8 mm to a length of about 310.80 mm; (3) a length of about 400.40 mm to a length of about 412.40 mm; or (4) a length of about 502.00 mm to a length/width of about 514.00 mm. In yet further examples, the length $L_{14}$ of the lower layer 14 may be defined by a length ranging from, for example: (1) a length of about 251.00 mm to a length of about 257.00 mm; (2) a length of about 301.8 mm to a length of about 307.80 mm; (3) a length of about 403.40 mm to a length of about 409.40 mm; or (4) a length of about 505.00 mm to a length of about 511.00 mm. In some examples, the length $L_{14}$ of the lower layer 14 may be defined by a length approximately equal to about 254.00 mm. In some instances, the length $L_{14}$ of the lower layer 14 may be defined by a length approximately equal to about 304.80 mm. In other instances, the length $L_{14}$ of the lower layer 14 may be defined by a length approximately equal to about 406.40 mm. In yet instances, the length $L_{14}$ of the lower layer 14 may be defined by a length approximately equal to about 508.00 mm.

In some examples, the width $W_{14}$ of the lower layer 14 may be defined by a width ranging from a width of about 200.00 mm to a width of about 550.00 mm. In further examples, the width $W_{14}$ of the lower layer 14 may be defined by a width ranging from, for example: (1) a width of about 248.00 mm to a width of about 260.00 mm; (2) a width of about 298.8 mm to a width of about 310.80 mm; (3) a width of about 400.40 mm to a width of about 412.40 mm; or (4) a width of about 502.00 mm to a width of about 514.00 mm. In yet further examples, the width $W_{14}$ of the lower layer 14 may be defined by a width ranging from, for example: (1) a width of about 251.00 mm to a width of about 257.00 mm; (2) a width of about 301.8 mm to a width of about 307.80 mm; (3) a width of about 403.40 mm to a width of about 409.40 mm; or (4) a width of about 505.00 mm to a width of about 511.00 mm. In some examples, the width $W_{14}$ of the lower layer 14 may be defined by a length/width approximately equal to about 254.00 mm. In some instances, the width $W_{14}$ of the lower layer 14 may be defined by a width approximately equal to about 304.80 mm. In other instances, the width $W_{14}$ of the lower layer 14 may be defined by a width approximately equal to about 406.40 mm. In yet instances, the width $W_{14}$ of the lower layer 14 may be defined by a width approximately equal to about 508.00 mm.

Referring to FIGS. 4 and 9-10, the intermediate layer 16 is defined by a thickness $T_{16}$ extending between the upper surface $16_U$ and the lower surface $16_L$. As will be described in the following disclosure at FIGS. 25A-25K and 26A-26K, a selected material of the intermediate layer 16 and the thickness $T_{16}$ of the intermediate layer 16 contributes to an optimization of the performance of the utilization of the assembly 10. Therefore, the skilled artisan will understand that a selected material and thickness $T_{16}$ of the intermediate layer 16 is not an obvious design choice that contributes to the design of the assembly 10.

As seen at FIG. 9, in some configurations, the side surface $16_S$ includes four side surface portions $16_{S1}$, $16_{S2}$, $16_{S3}$, $16_{S4}$. The side surface $16_S$ may optionally include arcuate corner side surface portions $16_{S5}$, $16_{S6}$, $16_{S7}$, $16_{S8}$ that connect adjacent side surface portions of the four side surface portions $16_{S1}$, $16_{S2}$, $16_{S3}$, $16_{S4}$.

With continued reference to FIG. 9, the intermediate layer 16 is further defined by a length $L_{16}$ and a width $W_{16}$. The length $L_{16}$ extends between the first side surface portion $16_{S1}$ and the second side surface portion $16_{S2}$. The width $W_{16}$ extends between the third side surface portion $16_{S3}$ and the fourth side surface portion $16_{S4}$. In some instances, the length $L_{16}$ may be approximately equal to the width $W_{16}$, and, as such, the intermediate layer 16 may generally define a square shape. However, in other configurations, the length $L_{16}$ may not be equal to the width $W_{16}$, and, as such, the intermediate layer 16 may generally define a rectangular shape. In other configurations, the side surface $16_S$ may include less than four sides or more than four sides such that the intermediate layer 16 may define any desirable shape, pattern, geometry or the like.

In some examples, the thickness $T_{16}$ of the intermediate layer 16 may be defined by a thickness ranging from a thickness of about 0.15 mm to a thickness of about 1.25 mm. In further examples, the thickness $T_{16}$ of the intermediate layer 16 may be defined by a thickness ranging from a thickness of about 0.25 mm to a thickness of about 0.50 mm. In yet further examples, the thickness $T_{16}$ of the intermediate layer 16 may be defined by a thickness ranging from a thickness of about 0.25 mm to a thickness of about 0.35 mm. In some instances, the thickness $T_{16}$ of the intermediate layer 16 may be defined by a thickness approximately equal to about 0.25 mm. In other instances, the thickness $T_{16}$ of the intermediate layer 16 may be defined by a thickness approximately equal to about 0.23 mm.

In some examples, the length $L_{16}$ of the intermediate layer 16 may be defined by a length ranging from a length of about 200.00 mm to a length of about 550.00 mm. In further examples, the length $L_{16}$ of the intermediate layer 16 may be defined by a length ranging from, for example: (1) a length of about 248.00 mm to a length of about 260.00 mm; (2) a length of about 298.8 mm to a length of about 310.80 mm; (3) a length of about 400.40 mm to a length of about 412.40 mm; or (4) a length of about 502.00 mm to a length of about 514.00 mm. In yet further examples, the length $L_{16}$ of the intermediate layer 16 may be defined by a length ranging from, for example: (1) a length of about 251.00 mm to a length of about 257.00 mm; (2) a length of about 301.8 mm to a length of about 307.80 mm; (3) a length of about 403.40 mm to a length of about 409.40 mm; or (4) a length of about 505.00 mm to a length of about 511.00 mm. In some examples, the length $L_{16}$ of the intermediate layer 16 may be defined by a length approximately equal to about 254.00 mm. In some instances, the length $L_{16}$ of the intermediate layer 16 may be defined by a length approximately equal to about 298.50 mm. In other instances, the length $L_{16}$ of the intermediate layer 16 may be defined by a length approximately equal to about 406.40 mm. In yet instances, the length $L_{16}$ of the intermediate layer 16 may be defined by a length approximately equal to about 502.00 mm.

In some examples, the width $W_{16}$ of the intermediate layer 16 may be defined by a width ranging from a width of about 200.00 mm to a width of about 550.00 mm. In further examples, the width $W_{16}$ of the intermediate layer 16 may be defined by a width ranging from, for example: (1) a width of about 248.00 mm to a width of about 260.00 mm; (2) a width of about 298.8 mm to a width of about 310.80 mm; (3) a width of about 400.40 mm to a width of about 412.40 mm; or (4) a width of about 502.00 mm to a width of about 514.00 mm. In yet further examples, the width $W_{16}$ of the intermediate layer 16 may be defined by a width ranging from, for example: (1) a width of about 251.00 mm to a width of about 257.00 mm; (2) a width of about 301.8 mm to a width of about 307.80 mm; (3) a width of about 403.40 mm to a width of about 409.40 mm; or (4) a width of about 505.00 mm to a width of about 511.00 mm. In some examples, the width $W_{16}$ of the intermediate layer 16 may be defined by a length/width approximately equal to about 254.00 mm. In some instances, the width $W_{16}$ of the intermediate layer 16 may be defined by a width approximately equal to about 298.50 mm. In other instances, the width $W_{16}$ of the intermediate layer 16 may be defined by a width approximately equal to about 406.40 mm. In yet instances, the width $W_{16}$ of the intermediate layer 16 may be defined by a width approximately equal to about 502.00 mm.

With reference to FIGS. 4 and 11-12, the top layer 18 of the second plurality of layers 18-20 includes an upper surface $18_U$, a lower surface 18l, and a side surface $18_S$ connecting the upper surface $18_U$ to the lower surface $18_L$. With reference to FIGS. 4 and 13-14, the bottom layer 20 includes an upper surface $20_U$, a lower surface $20_L$ and a side surface $20_S$ connecting the upper surface $20_U$ to the lower surface $20_L$.

Referring to FIGS. 4 and 11-12, the top layer 18 is defined by a thickness $T_{18}$ extending between the top surface $18_U$ and the lower surface $18_L$. As will be described in the following disclosure at FIGS. 25A-25K and 26A-26K, a selected material of the top layer 18 and the thickness $T_{18}$ of the top layer 18 contributes to an optimization of the performance of the utilization of the assembly 10. Therefore, the skilled artisan will understand that a selected material and thickness $T_{18}$ of the top layer 18 is not an obvious design choice that contributes to the design of the assembly 10.

As seen at FIG. 11, in some configurations, the side surface $18_S$ includes four side surface portions $18_{S1}$, $18_{S2}$, $18_{S3}$, $18_{S4}$. The side surface $18_S$ may optionally include arcuate corner side surface portions $18_{S5}$, $18_{S6}$, $18_{S7}$, $18_{S8}$ that connect adjacent side surface portions of the four side surface portions $18_{S1}$, $18_{S2}$, $18_{S3}$, $18_{S4}$.

With continued reference to FIG. 11, the top layer 18 is further defined by a length $L_{18}$ and a width $W_{18}$. The length $L_{18}$ extends between the first side surface portion $18_{S1}$ and the second side surface portion $18_{S2}$. The width $W_{18}$ extends between the third side surface portion $18_{S3}$ and the fourth side surface portion $18_{S4}$. In some instances, the length $L_{18}$ may be approximately equal to the width $W_{18}$, and, as such, the top layer 18 may generally define a square shape. However, in other configurations, the length $L_{18}$ may not be equal to the width $W_{18}$, and, as such, the top layer 18 may generally define a rectangular shape. In other configurations, the side surface $18_S$ may include less than four sides or more than four sides such that the top layer 18 may define any desirable shape, pattern, geometry or the like.

In some examples, the thickness $T_{18}$ of the top layer 18 may be defined by a thickness ranging from a thickness of about 0.10 mm to a thickness of about 1.24 mm. In further examples, the thickness $T_{18}$ of the top layer 18 may be defined by a thickness ranging from a thickness of about 0.10 mm to a thickness of about 0.49 mm. In yet further examples, the thickness $T_{18}$ of the top layer 18 may be defined by a thickness ranging from a thickness of about 0.10 mm to a thickness of about 0.34 mm. In some instances, the thickness $T_{18}$ of the top layer 18 may be defined by a thickness approximately equal to about 0.24 mm. In other instances, the thickness $T_{18}$ of the top layer 18 may be defined by a thickness approximately equal to about 0.25 mm.

In some examples, the length $L_{18}$ of the top layer 18 may be defined by a length ranging from a length of about 210.00 mm to a length of about 560.00 mm. In further examples, the length $L_{18}$ of the top layer 18 may be defined by a length ranging from, for example: (1) a length of about 258.00 mm to a length of about 270.00 mm; (2) a length of about 308.8 mm to a length of about 320.80 mm; (3) a length of about 410.40 mm to a length of about 422.40 mm; or (4) a length of about 512.00 mm to a length of about 524.00 mm. In yet further examples, the length $L_{12}$ of the upper layer 12 may be defined by a length ranging from, for example: (1) a length of about 261.00 mm to a length of about 267.00 mm; (2) a length of about 311.8 mm to a length of about 317.80 mm; (3) a length of about 413.40 mm to a length of about 419.40 mm; or (4) a length of about 515.00 mm to a length of about 521.00 mm. In some examples, the length $L_{18}$ of the top layer 18 may be defined by a length approximately equal to about 264.00 mm. In some instances, the length $L_{18}$ of the top layer 18 may be defined by a length approximately equal to about 314.80 mm. In other instances, the length $L_{18}$ of the top layer 18 may be defined by a length approximately equal to about 416.40 mm. In yet instances, the length $L_{18}$ of the top layer 18 may be defined by a length approximately equal to about 518.00 mm.

In some examples, the width $W_{18}$ of the top layer 18 may be defined by a width ranging from a width of about 210.00 mm to a width of about 560.00 mm. In further examples, the width $W_{18}$ of the top layer 18 may be defined by a width ranging from, for example: (1) a width of about 258.00 mm to a width of about 270.00 mm; (2) a width of about 308.8 mm to a width of about 320.80 mm; (3) a width of about 410.40 mm to a width of about 422.40 mm; or (4) a width of about 512.00 mm to a width of about 524.00 mm. In yet further examples, the width $L_{12}$ of the upper layer 12 may be defined by a width ranging from, for example: (1) a width of about 261.00 mm to a width of about 267.00 mm; (2) a width of about 311.8 mm to a width of about 317.80 mm; (3) a width of about 413.40 mm to a width of about 419.40 mm; or (4) a width of about 515.00 mm to a width of about 521.00 mm. In some examples, the width $W_{18}$ of the top layer 18 may be defined by a width approximately equal to about 264.00 mm. In some instances, the width $W_{18}$ of the top layer 18 may be defined by a width approximately equal to about 314.80 mm. In other instances, the width $W_{18}$ of the top layer 18 may be defined by a width approximately equal to about 416.40 mm. In yet instances, the width $W_{18}$ of the top layer 18 may be defined by a width approximately equal to about 518.00 mm.

Referring to FIGS. 4 and 13-14, the bottom layer 20 is defined by a thickness $T_{20}$ extending between the bottom surface $20_U$ and the lower surface $20_L$. As will be described in the following disclosure at FIGS. 25A-25K and 26A-26K, a selected material of the bottom layer 20 and the thickness $T_{20}$ of the bottom layer 20 contributes to an optimization of the performance of the utilization of the assembly 10. Therefore, the skilled artisan will understand that a selected material and thickness $T_{20}$ of the bottom layer 20 is not an obvious design choice that contributes to the design of the assembly 10.

As seen at FIG. 13, in some configurations, the side surface $20_S$ includes four side surface portions $20_{S1}$, $20_{S2}$, $20_{S3}$, $20_{S4}$. The side surface $20_S$ may optionally include arcuate corner side surface portions $20_{S5}$, $20_{S6}$, $20_{S7}$, $20_{S8}$ that connect adjacent side surface portions of the four side surface portions $20_{S1}$, $20_{S2}$, $20_{S3}$, $20_{S4}$.

With continued reference to FIG. 13, the bottom layer 20 is further defined by a length $L_{20}$ and a width $W_{20}$. The length $L_{20}$ extends between the first side surface portion $20_{S1}$ and the second side surface portion $20_{S2}$. The width $W_{20}$ extends between the third side surface portion $20_{S3}$ and the fourth side surface portion $20_{S4}$. In some instances, the length $L_{20}$ may be approximately equal to the width $W_{20}$, and, as such, the bottom layer 20 may generally define a square shape. However, in other configurations, the length $L_{20}$ may not be equal to the width $W_{20}$, and, as such, the bottom layer 20 may generally define a rectangular shape. In other configurations, the side surface $20_S$ may include less than four sides or more than four sides such that the bottom layer 20 may define any desirable shape, pattern, geometry or the like.

In some examples, the thickness $T_{20}$ of the bottom layer 20 may be defined by a thickness ranging from a thickness of about 0.10 mm to a thickness of about 1.50 mm. In further examples, the thickness $T_{20}$ of the bottom layer 20 may be defined by a thickness ranging from a thickness of about 0.50 mm to a thickness of about 0.75 mm. In yet further examples, the thickness $T_{20}$ of the bottom layer 20 may be defined by a thickness ranging from a thickness of about 0.50 mm to a thickness of about 0.60 mm. In some instances, the thickness $T_{20}$ of the bottom layer 20 may be defined by a thickness approximately equal to about 0.50 mm. In other instances, the thickness $T_{20}$ of the bottom layer 20 may be defined by a thickness approximately equal to about 0.25 mm.

In some examples, the length $L_{20}$ of the bottom layer 20 may be defined by a length ranging from a length of about 210.00 mm to a length of about 560.00 mm. In further examples, the length $L_{20}$ of the bottom layer 20 may be defined by a length ranging from, for example: (1) a length of about 258.00 mm to a length of about 270.00 mm; (2) a length of about 308.8 mm to a length of about 320.80 mm; (3) a length of about 410.40 mm to a length of about 422.40 mm; or (4) a length of about 512.00 mm to a length of about 524.00 mm. In yet further examples, the length $L_{12}$ of the upper layer 12 may be defined by a length ranging from, for example: (1) a length of about 261.00 mm to a length of about 267.00 mm; (2) a length of about 311.8 mm to a length of about 317.80 mm; (3) a length of about 413.40 mm to a length of about 419.40 mm; or (4) a length of about 515.00 mm to a length of about 521.00 mm. In some examples, the length $L_{20}$ of the bottom layer 20 may be defined by a length approximately equal to about 264.00 mm. In some instances, the length $L_{20}$ of the bottom layer 20 may be defined by a length approximately equal to about 314.80 mm. In other instances, the length $L_{20}$ of the bottom layer 20 may be defined by a length approximately equal to about 416.40 mm. In yet instances, the length $L_{20}$ of the bottom layer 20 may be defined by a length approximately equal to about 518.00 mm.

In some examples, the width $W_{20}$ of the bottom layer 20 may be defined by a width ranging from a width of about 210.00 mm to a width of about 560.00 mm. In further examples, the width $W_{20}$ of the bottom layer 20 may be defined by a width ranging from, for example: (1) a width of about 258.00 mm to a width of about 270.00 mm; (2) a width of about 308.8 mm to a width of about 320.80 mm; (3) a width of about 410.40 mm to a width of about 422.40 mm; or (4) a width of about 512.00 mm to a width of about 524.00 mm. In yet further examples, the width $L_{12}$ of the upper layer 12 may be defined by a width ranging from, for example: (1) a width of about 261.00 mm to a width of about 267.00 mm; (2) a width of about 311.8 mm to a width of about 317.80 mm; (3) a width of about 413.40 mm to a width of about 419.40 mm; or (4) a width of about 515.00 mm to a width of about 521.00 mm. In some examples, the width $W_{20}$ of the bottom layer 20 may be defined by a width approximately equal to about 264.00 mm. In some instances, the width $W_{20}$ of the bottom layer 20 may be defined by a width approximately equal to about 314.80 mm. In other instances, the width $W_{20}$ of the bottom layer 20 may be defined by a width approximately equal to about 416.40 mm. In yet instances, the width $W_{20}$ of the bottom layer 20 may be defined by a width approximately equal to about 518.00 mm.

Referring to FIGS. 3-4, the assembly 10 is further formed by arranging or disposing the lower surface $18_L$ of the top layer 18 over or adjacent the upper surface $12_U$ of the upper layer 12. With continued reference to FIGS. 3-4, the assembly 10 is yet further formed by arranging or disposing the upper surface $20_U$ of the bottom layer 20 over or adjacent the lower surface $14_L$ of the lower layer 14.

As seen at FIGS. 3-4 and 18-19, after: (1) the lower surface $18_L$ of the top layer 18 is arranged over or disposed adjacent the upper surface $12_U$ of the upper layer 12; and (2) the upper surface $20_U$ of the bottom layer 20 is arranged over or disposed adjacent the lower surface $14_L$ of the lower layer 14, the fastening portion 22 secures a portion of the top layer 18 near the side surface $18_S$ may of the top layer 18 to a portion of the bottom layer 20 near the side surface $20_S$ may of the bottom layer 20. Accordingly, as seen at FIGS. 18-19, the top layer 18, the bottom layer 20 and the fastening portion 22 define the container portion 24 of the assembly 10 that contain the layered interior body portion 26 defined by the first plurality of layers 12-16 that includes the upper layer 12, the lower layer 14 and the intermediate layer 16.

With reference to FIGS. 18-19, the container portion 24 defines the chamber or cavity 28 that is sized for containing the layered interior body portion 26. With reference to FIGS. 17-18, when the layered interior body portion 26 is secured within the cavity 28 of the container portion 24, the container portion 24 is defined by a thickness $T_{24}$ extending between an upper surface $24_U$ of the container portion 24 and a lower surface $24_L$ of the container portion 24. The thickness $T_{24}$ of the container portion 24 may alternatively be referred to as a thickness of the assembly 10 such that the thickness $T_{24}$ of the container portion 24 accounts for the collective thickness $T_{18}$, $T_{20}$ (e.g., approximately about 0.10 mm and 0.5 mm, respectively, that equals approximately about 0.74 mm) of each of the top layer 18 and the bottom layer 20 but also a height of the cavity 28 of the container portion 24 that is sized for receiving a thickness of the layered interior body portion 26 that is collectively defined by the thickness $T_{12}$, $T_{14}$, $T_{16}$ (e.g., approximately about 2.85 mm, 10 mm and 0.25 mm, respectively, that equals approximately about 13.10 mm) of each of the upper layer 12, the lower layer 14 and the intermediate layer 16.

Accordingly, in some instances, the thickness $T_{24}$ of the container portion 24 (which may be alternatively referred to as a thickness of the assembly 10) may be approximately equal to about 13.70 mm. Furthermore, the collective thickness $T_{18}$, $T_{20}$ of the container portion 24 may be defined by a thickness ranging from about 0.20 mm to about 2.74 mm. Yet even further, the collective thickness $T_{12}$, $T_{14}$, $T_{16}$ of the layered interior body portion 26 may be defined by a thickness ranging from about 6.65 mm to about 29.10 mm. Furthermore, the thickness $T_{24}$ of the container portion 24 (which may be alternatively referred to as a thickness of the assembly 10) may be defined by a thickness ranging from about 6.85 mm to about 31.84 mm.

Figure 15:
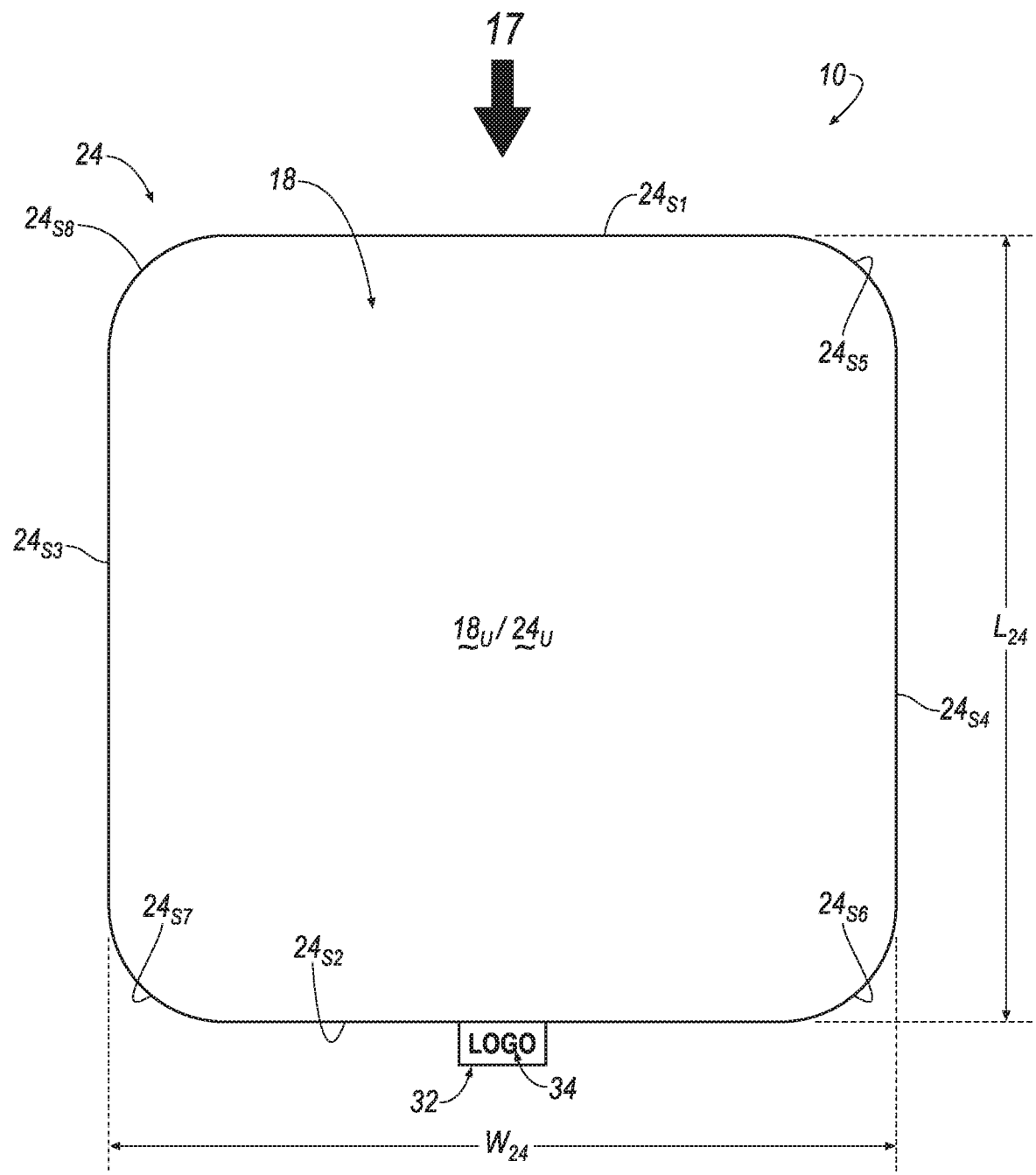
FIG. 15 is a front view of the assembly of FIG. 1.
Figure 16:
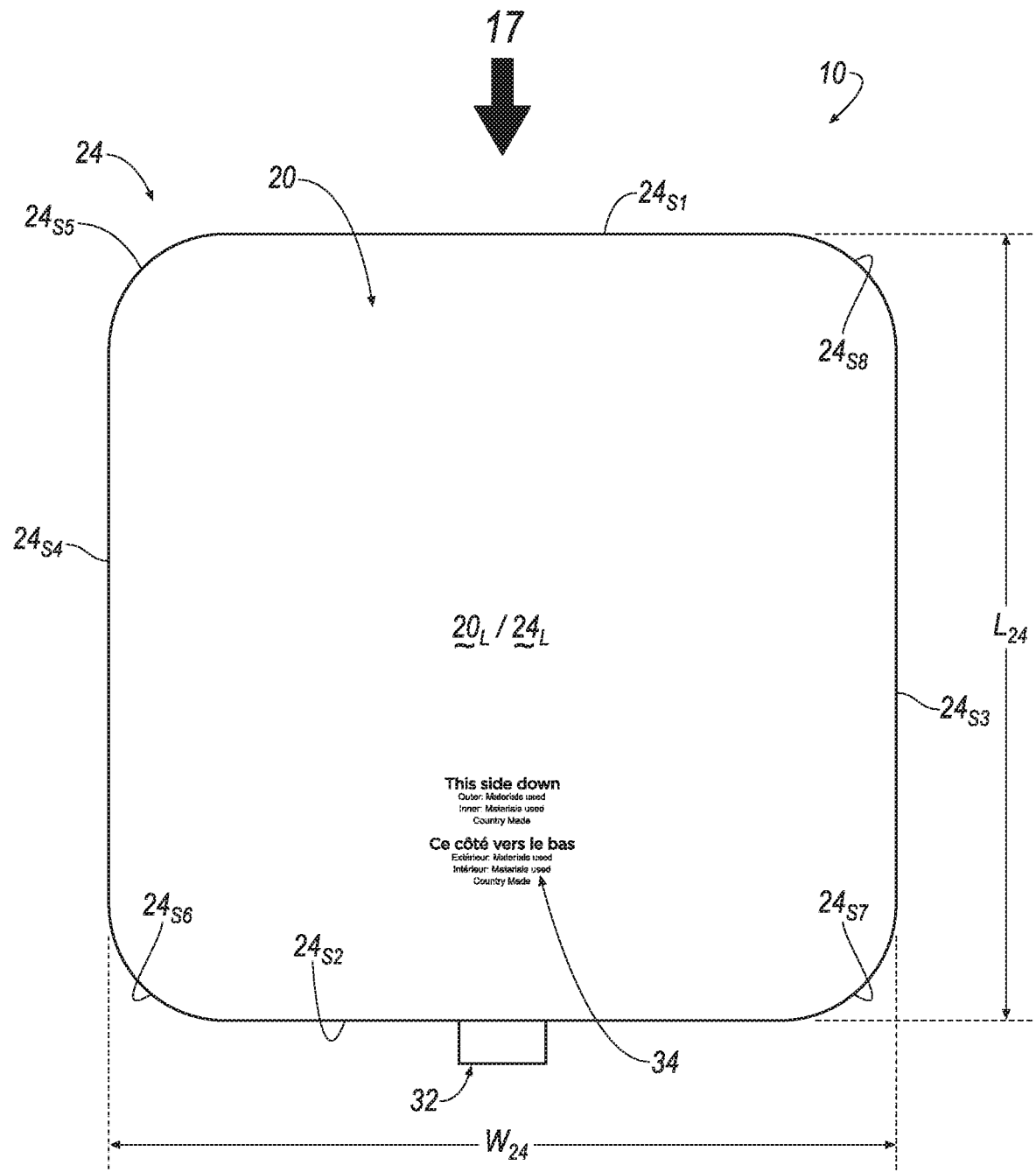
FIG. 16 is a rear view of the assembly of FIG. 1.

In some configurations as seen at, for example, FIGS. 15-16, a side surface $24_S$ of the container portion 24 includes four side surface portions $24_{S1}$, $24_{S2}$, $24_{S3}$, $24_{S4}$. The side surface $24_S$ of the container portion 24 may optionally include arcuate corner side surface portions $24_{S5}$, $24_{S6}$, $24_{S7}$, $24_{S8}$ that connect adjacent side surface portions of the four side surface portions $24_{S1}$, $24_{S2}$, $24_{S3}$, $24_{S4}$.

As seen at FIGS. 1-2 and 17-18, the fastening portion 22 may be thread that is stitched through the top layer 18 and the bottom layer 20 for defining a seam 30 that separates the side surface $24_S$ of the container portion 24 into an upper side surface portion $24su$ defined by the top layer 18 and a lower side surface portion $24_{SL}$ defined by the bottom layer 20.

Referring to FIGS. 15-16, the container portion 24 is further defined by a length $L_{24}$ and a width $W_{24}$. The length $L_{24}$ extends between the first side surface portion $24_{S1}$ and the second side surface portion $24_{S2}$. The width $W_{24}$ extends between the third side surface portion $24_{S3}$ and the fourth side surface portion $24_{S4}$. In some instances, the length $L_{24}$ may be approximately equal to the width $W_{24}$, and, as such, the container portion 24 may generally define a square shape. However, in other configurations, the length $L_{24}$ may not be equal to the width $W_{24}$, and, as such, the container portion 24 may generally define a rectangular shape. In other configurations, the side surface $24_S$ may include less than four sides or more than four sides such that the container portion 24 may define any desirable shape, pattern, geometry or the like.

In some examples, the thickness $T_{24}$ of the container portion 24 may be defined by a thickness ranging from a thickness of about 6.85 mm to a thickness of about 31.84 mm. In further examples, the thickness $T_{24}$ of the container portion 24 may be defined by a thickness ranging from a thickness of about 8.99 mm to a thickness of about 29.84 mm. In yet further examples, the thickness $T_{24}$ of the container portion 24 may be defined by a thickness ranging from a thickness of about 10.99 mm to a thickness of about 27.84 mm. In some instances, the thickness $T_{24}$ of the container portion 24 may be defined by a thickness approximately equal to about 16.00 mm. In other instances, the thickness $T_{24}$ of the container portion 24 may be defined by a thickness approximately equal to about 16.44 mm. In yet other instances, the thickness $T_{24}$ of the container portion 24 may be defined by a thickness approximately equal to about 12.93 mm.

In some examples, the length $L_{24}$ of the container portion 24 may be defined by a length ranging from a length of about 210.00 mm to a length of about 560.00 mm. In further examples, the length $L_{24}$ of the container portion 24 may be defined by a length ranging from, for example: (1) a length of about 258.00 mm to a length of about 270.00 mm; (2) a length of about 308.8 mm to a length of about 320.80 mm; (3) a length of about 410.40 mm to a length of about 422.40 mm; or (4) a length of about 512.00 mm to a length of about 524.00 mm. In yet further examples, the length $L_{12}$ of the upper layer 12 may be defined by a length ranging from, for example: (1) a length of about 261.00 mm to a length of about 267.00 mm; (2) a length of about 311.8 mm to a length of about 317.80 mm; (3) a length of about 413.40 mm to a length of about 419.40 mm; or (4) a length of about 515.00 mm to a length of about 521.00 mm. In some examples, the length $L_{24}$ of the container portion 24 may be defined by a length approximately equal to about 264.00 mm. In some instances, the length $L_{24}$ of the container portion 24 may be defined by a length approximately equal to about 314.80 mm. In other instances, the length $L_{24}$ of the container portion 24 may be defined by a length approximately equal to about 416.40 mm. In yet instances, the length $L_{24}$ of the container portion 24 may be defined by a length approximately equal to about 518.00 mm.

In some examples, the width $W_{24}$ of the container portion 24 may be defined by a width ranging from a width of about 210.00 mm to a width of about 560.00 mm. In further examples, the width $W_{24}$ of the container portion 24 may be defined by a width ranging from, for example: (1) a width of about 258.00 mm to a width of about 270.00 mm; (2) a width of about 308.8 mm to a width of about 320.80 mm; (3) a width of about 410.40 mm to a width of about 422.40 mm; or (4) a width of about 512.00 mm to a width of about 524.00 mm. In yet further examples, the width $L_{12}$ of the upper layer 12 may be defined by a width ranging from, for example: (1) a width of about 261.00 mm to a width of about 267.00 mm; (2) a width of about 311.8 mm to a width of about 317.80 mm; (3) a width of about 413.40 mm to a width of about 419.40 mm; or (4) a width of about 515.00 mm to a width of about 521.00 mm. In some examples, the width $W_{24}$ of the container portion 24 may be defined by a width approximately equal to about 264.00 mm. In some instances, the width $W_{24}$ of the container portion 24 may be defined by a width approximately equal to about 314.80 mm. In other instances, the width $W_{24}$ of the container portion 24 may be defined by a width approximately equal to about 416.40 mm. In yet instances, the width $W_{24}$ of the container portion 24 may be defined by a width approximately equal to about 518.00 mm.

Referring to FIGS. 1-3 and 15-16, the assembly 10 may include one or more optional components 32-34. In a first example, the one or more optional components 32-34 include a tag 32. The tag 32 is secured to one or both of the top layer 18 and the bottom layer 20. The tag 32 extends from the side surface $24_S$ of the container portion 24. In some examples, the tag 32 extends from the seam 30; accordingly, the fastening portion 22 that defines the seam 30 may be utilized for securing the tag 32 to one or both of the top layer 18 and the bottom layer 20 that defines the container portion 24.

In another example, the one or more optional components 32-34 include indicia, logo or the like that is seen generally at 34. Referring to FIGS. 1, 3 and 15, the indicia or logo 34 may be formed from ink or threaded embroidery that is secured to, binds to or is adhered to one or both of the container portion 24 and the tag 32. In some instances, the tag 32 is stitched with a thread that defines an embroided indicia or logo 34; accordingly, the tag 32 and indicia or logo 34 functions as a non-removably-attached product identifier that defines, for example, a tradename, manufacturer or other form of identification such that a consumer is able to associate a level of quality associated with the manufacture of the assembly 10 and/or is not otherwise deceived by an "off brand" product.

In yet another example as seen at FIGS. 2 and 16, the indicia or logo 34 may ink or the like that is printed on one or more of the upper surface $18_U$ of the top layer 18 and the lower surface $20_L$ of the bottom layer 20. In some instances, the indicia or logo 34 may include text defining an orientation identifier such as, for example "This Side Down" such that a user may easily identify an orientation of the assembly 10 during the course of using the assembly 10 as seen at, for example, FIGS. 25A-25K and 26A-26K. In other instances, the indicia or logo 34 may include text identifying the types of materials that have been utilized for forming the assembly 10, the country of manufacture of the assembly 10 or the like. In yet other instances, the indicia or logo 34 may include text in more than one language in the event that the assembly 10 is intended to be utilized by a diverse population of users speaking different languages.

One or a combination of: (1) the thicknesses $T_{12}$, $T_{14}$, $T_{16}$, $T_{18}$, $T_{20}$ described above for each of the upper layer 12, the lower layer 14, the intermediate layer 16, the top layer 18 and the bottom layer 20; and (2) the chosen material for the design of each of the upper layer 12, the lower layer 14, the intermediate layer 16, the top layer 18 and the bottom layer 20 may be related to optimizing the performance of the utilization of the assembly 10 as seen at, for example, FIGS. 25A-25K and 26A-26K. Prior to describing the utilization of the assembly 10 at as seen at, for example, FIGS. 25A-25K and 26A-26K, reference is made to FIGS. 20-24, illustrating a plurality of implements 50, 75 that are interfaced with the assembly 10.

Figure 26A:
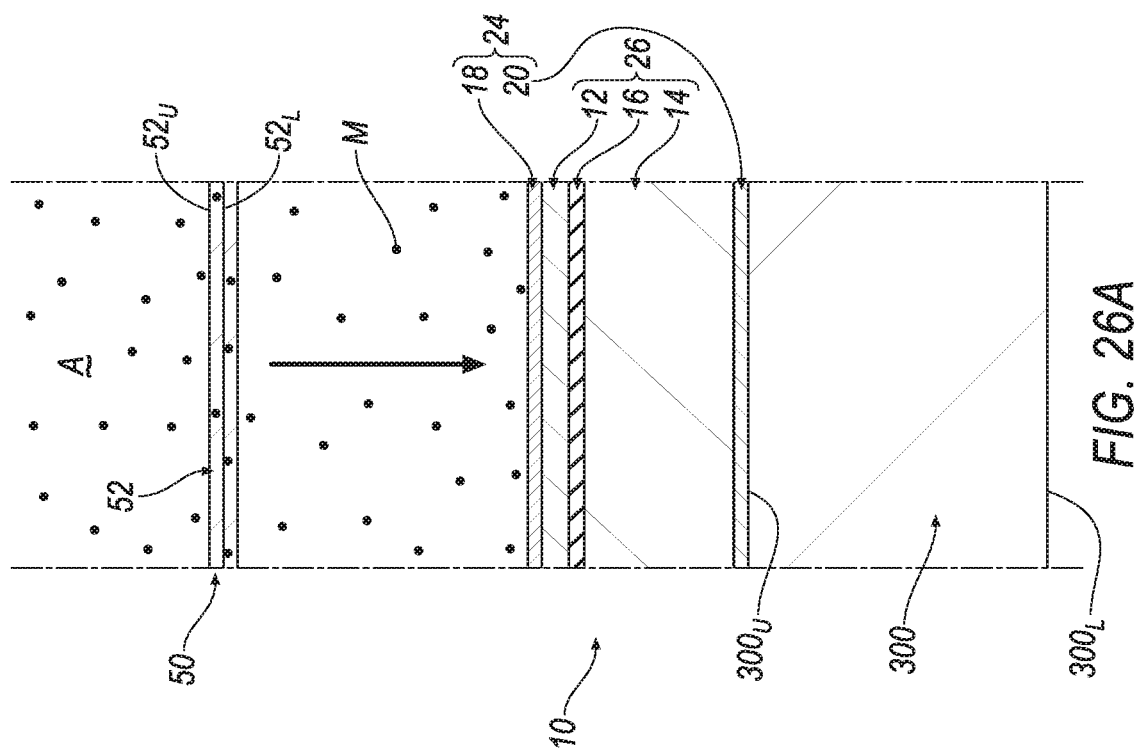
Figure 25A:
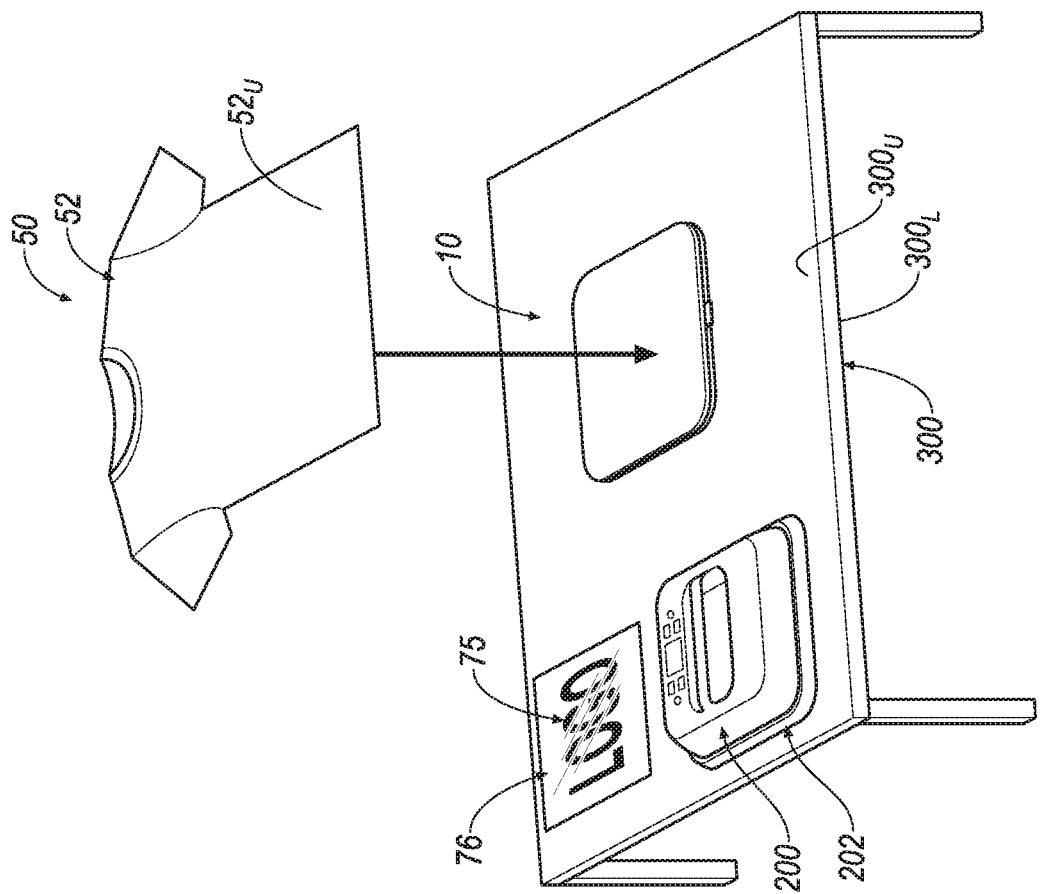
Figure 26C:
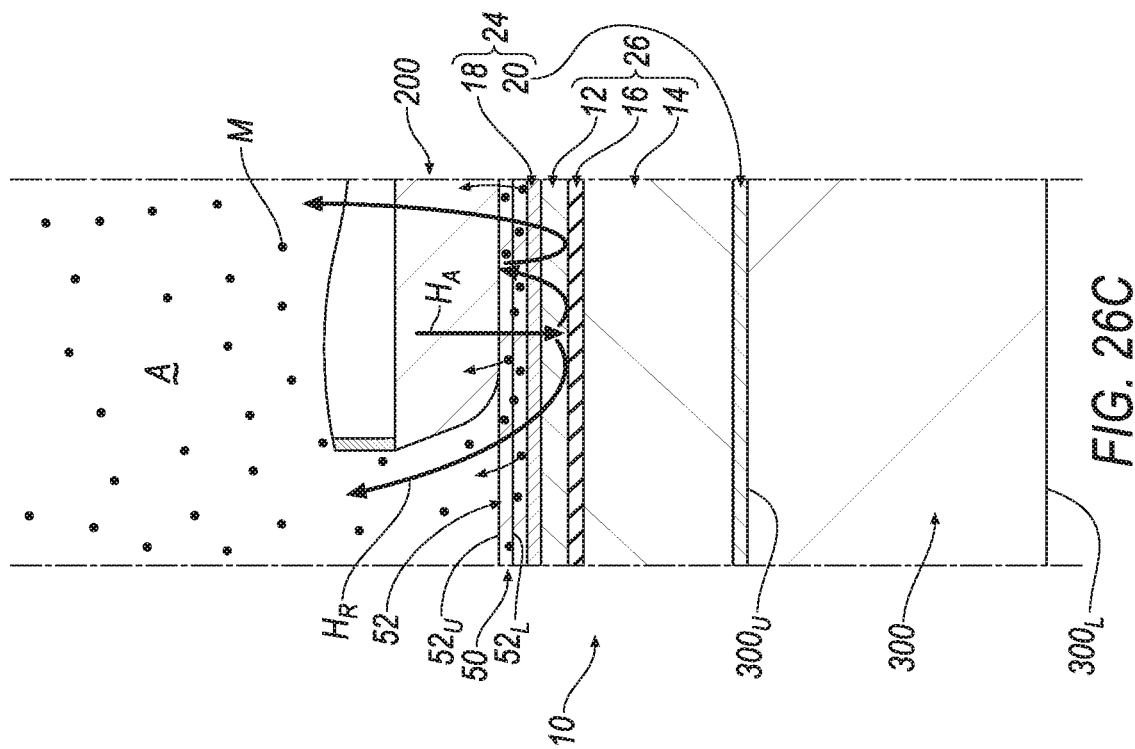
Figure 25C:
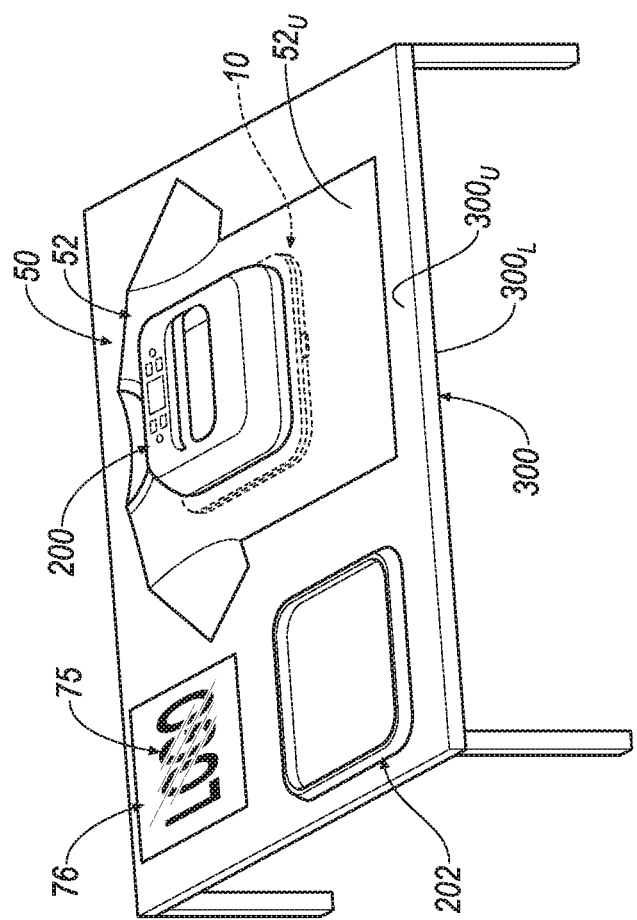
Figure 26D:
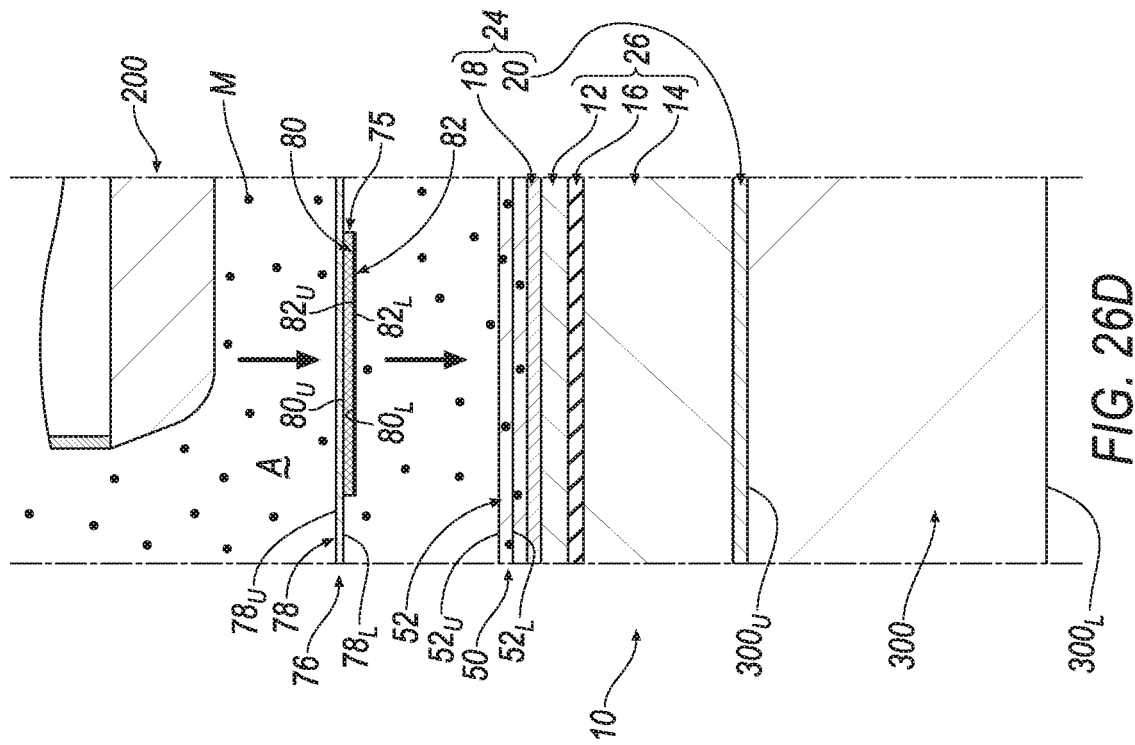
Figure 25D:
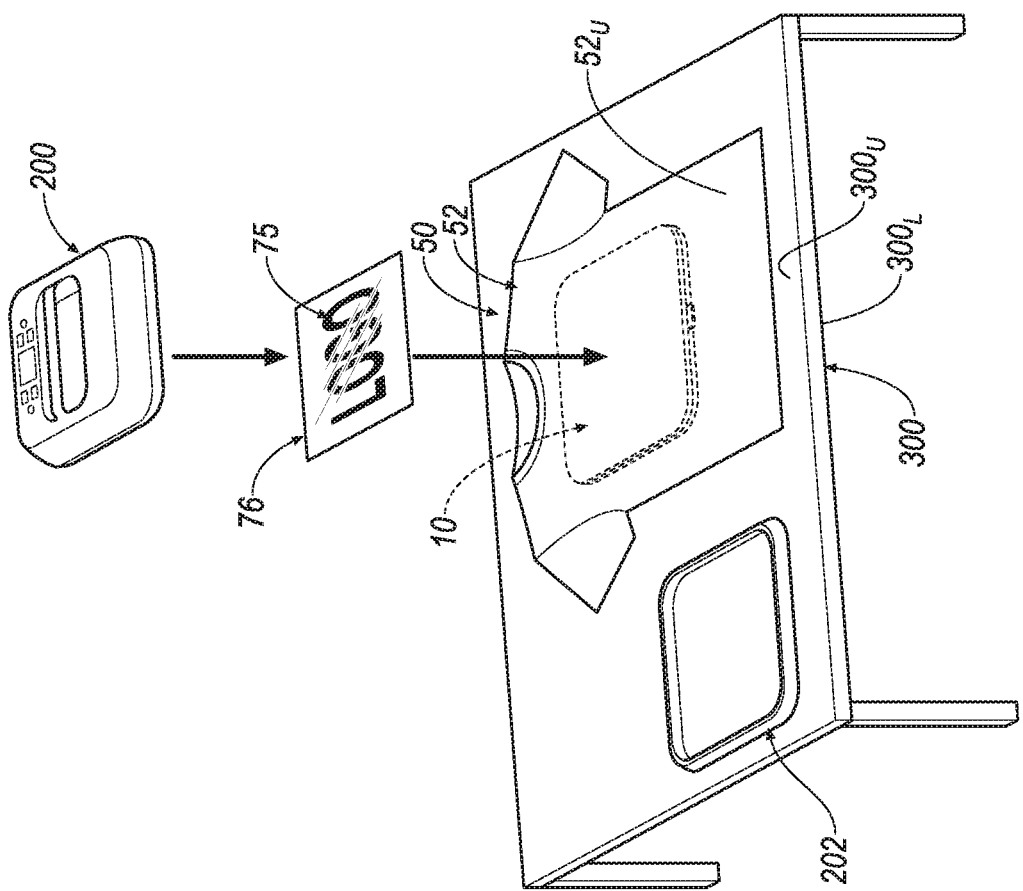
Figure 26E:
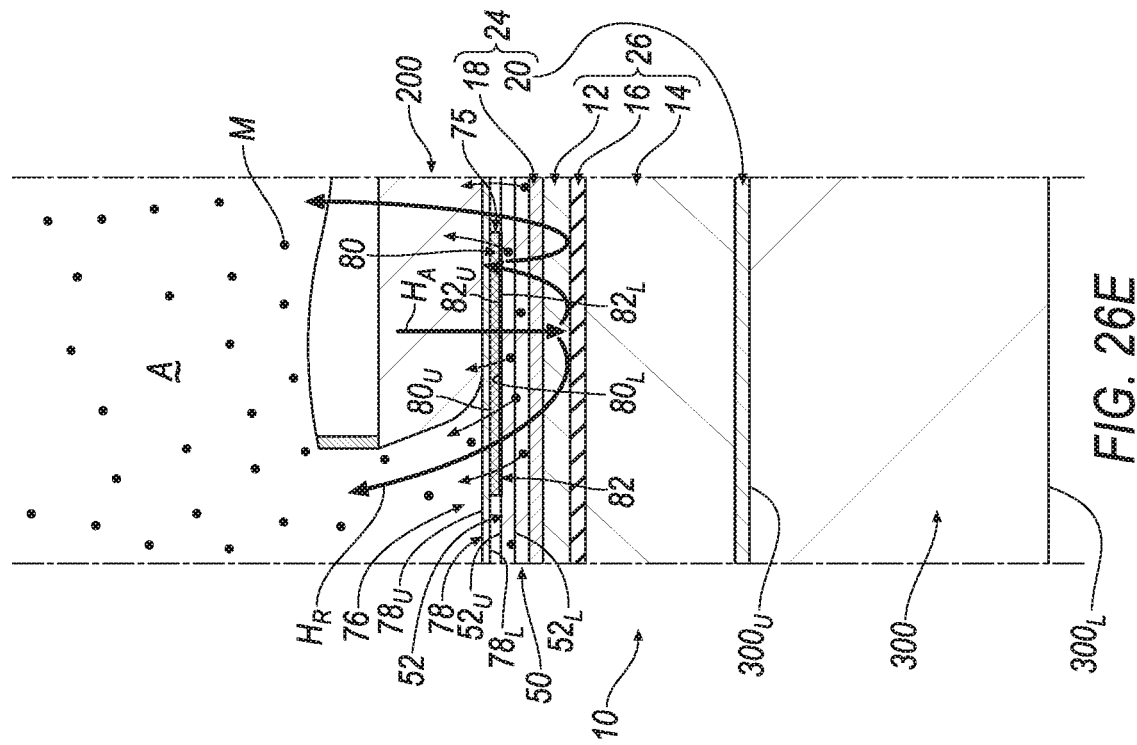
Figure 25E:
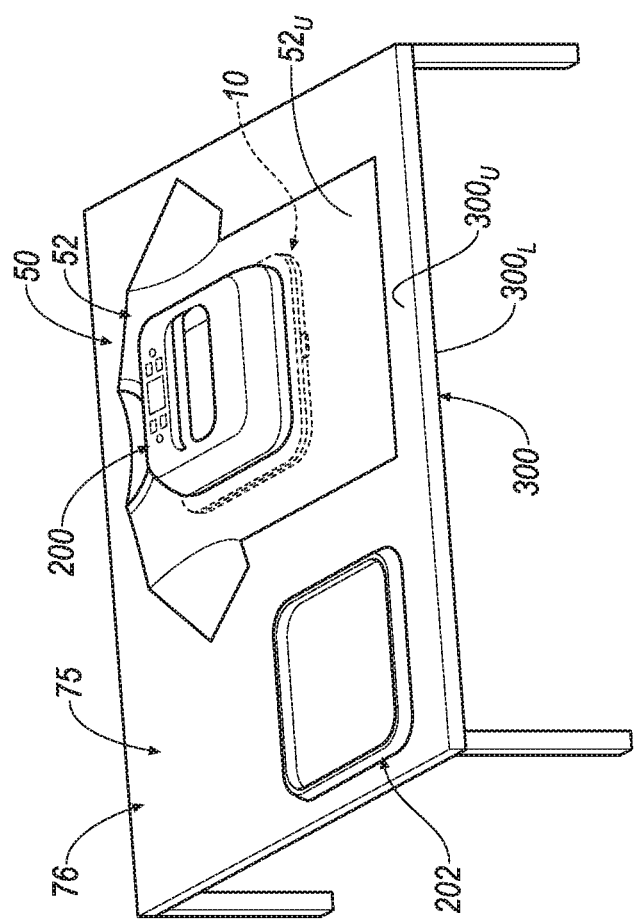
Figure 26G:
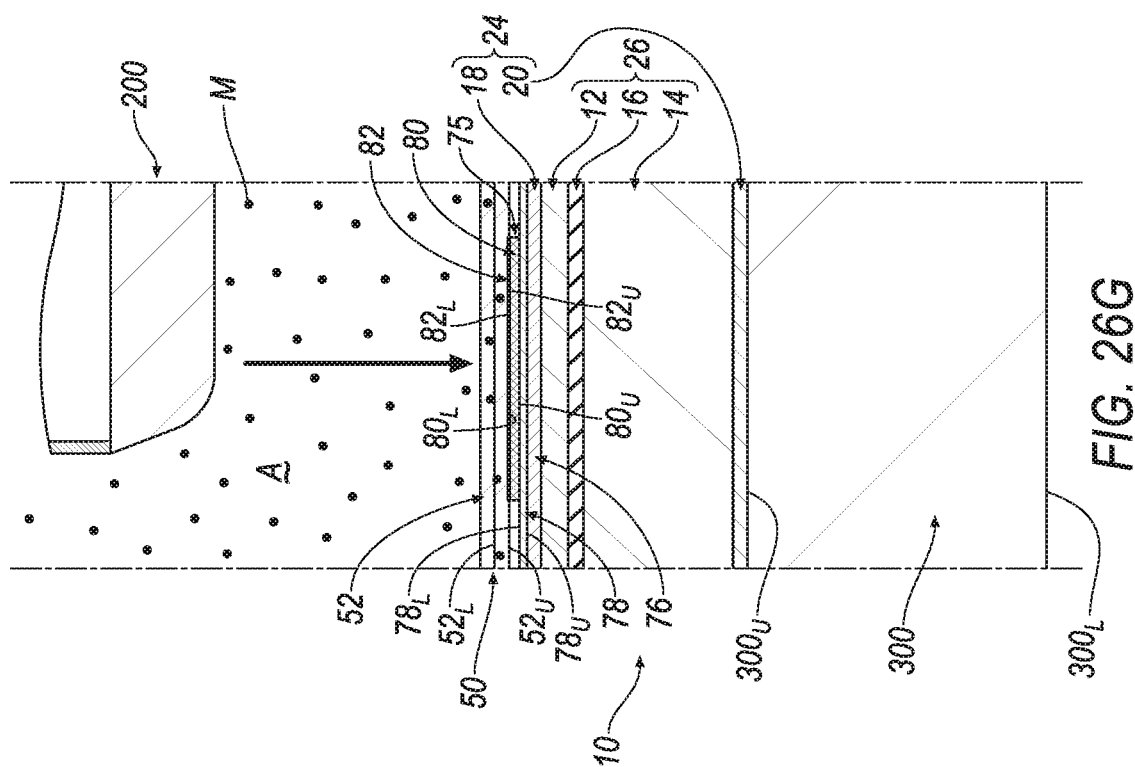
Figure 25G:
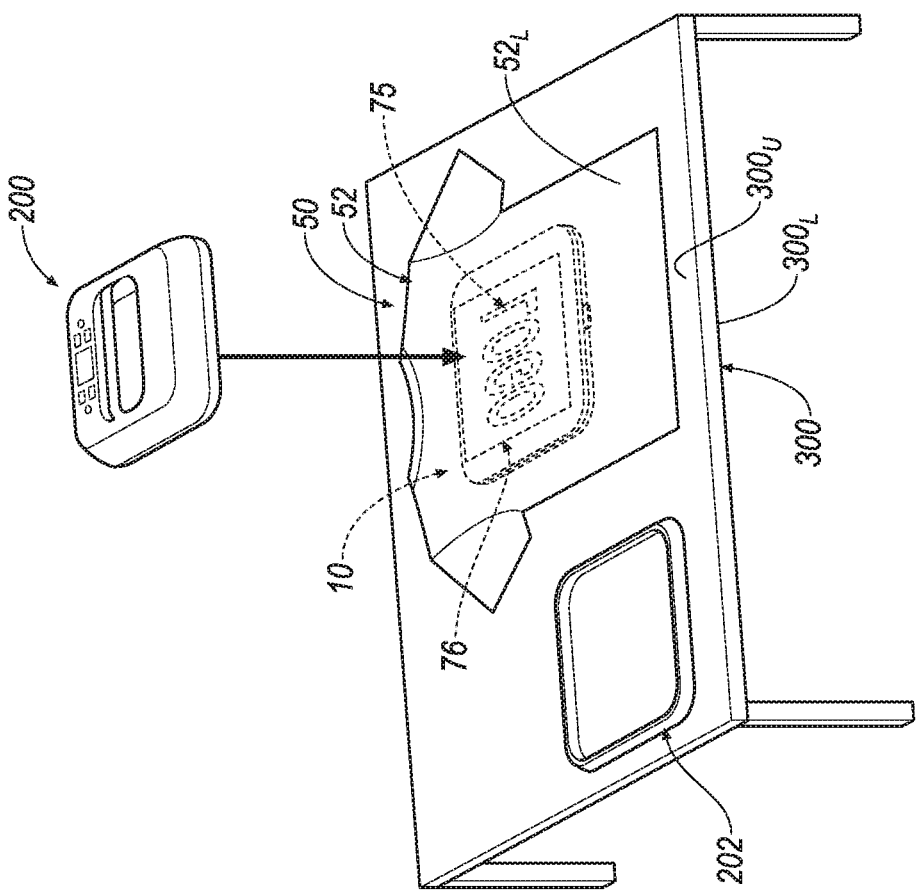
Figure 26I:
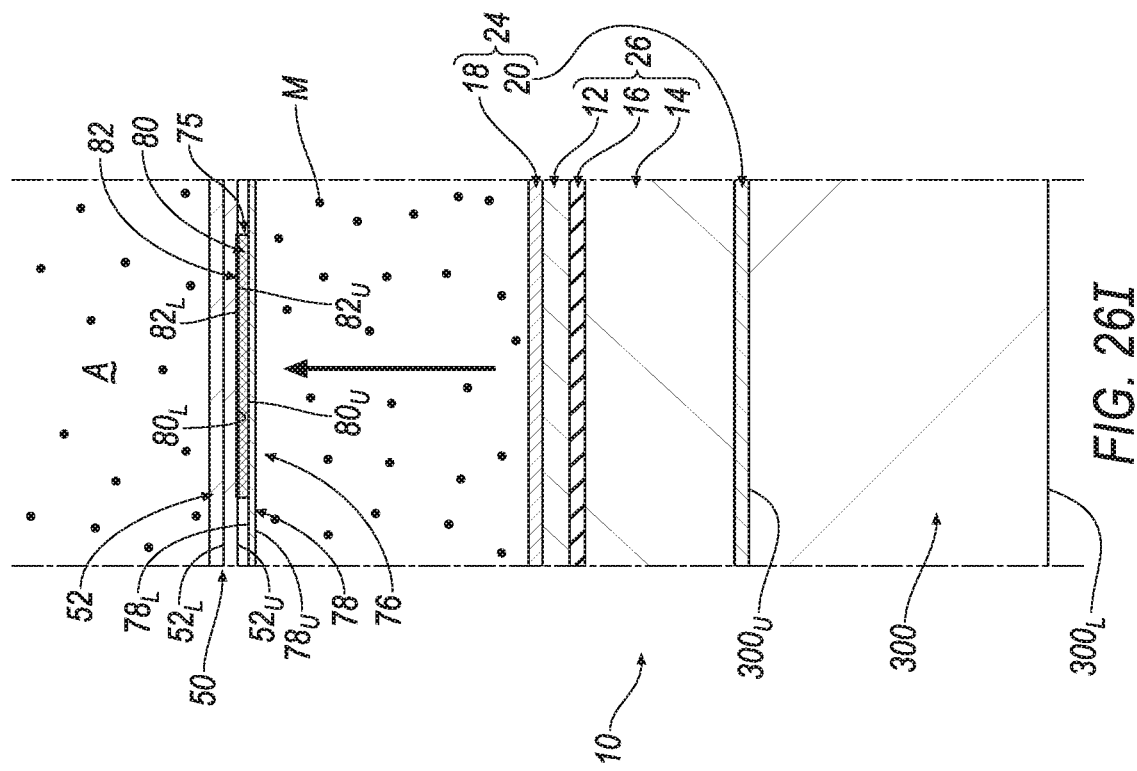
Figure 25I:
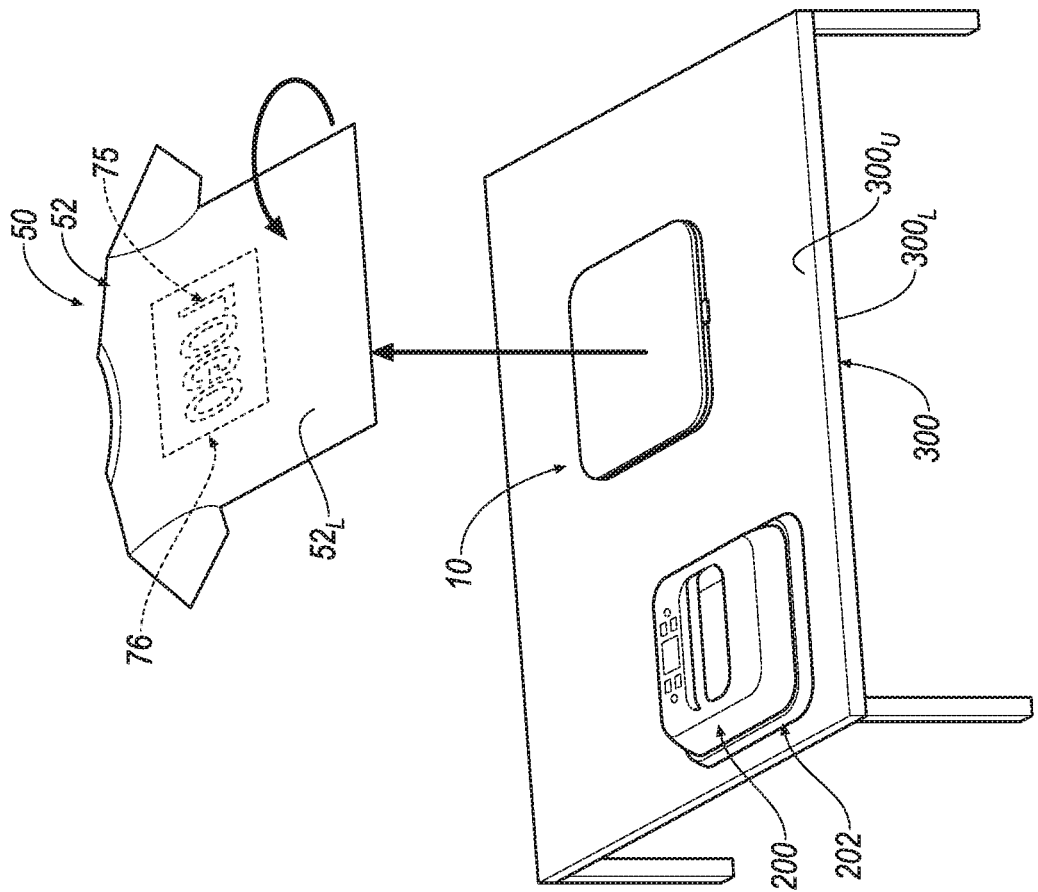
Figure 26J:
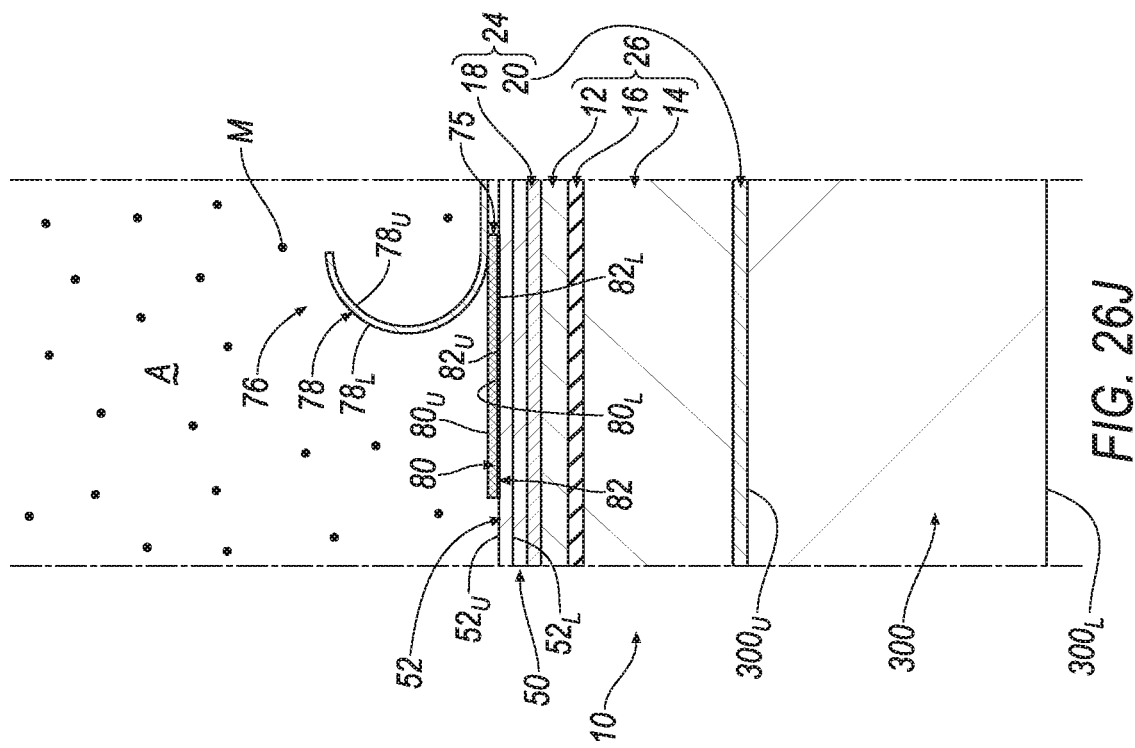
Figure 25J:
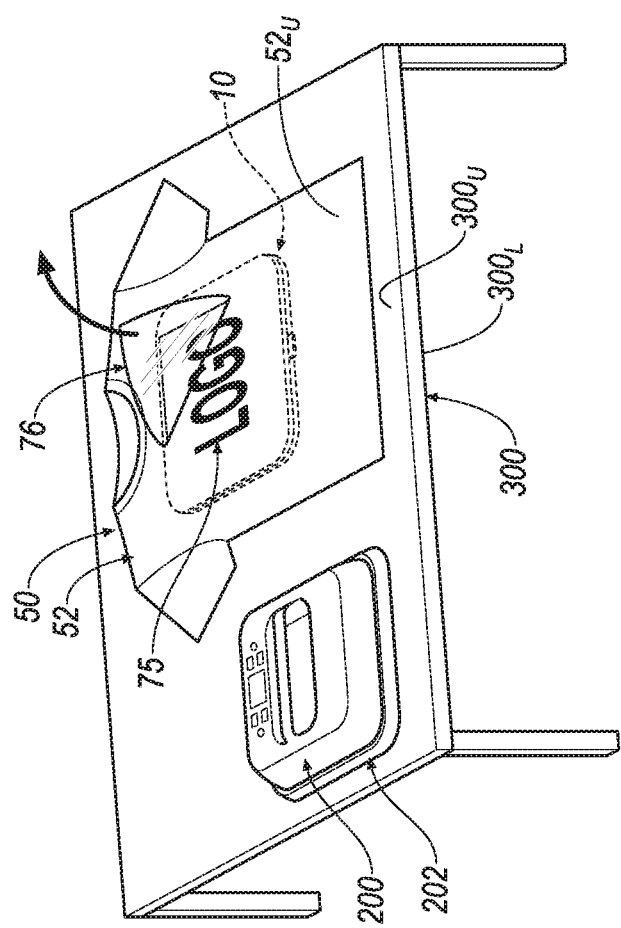
Figure 25K:
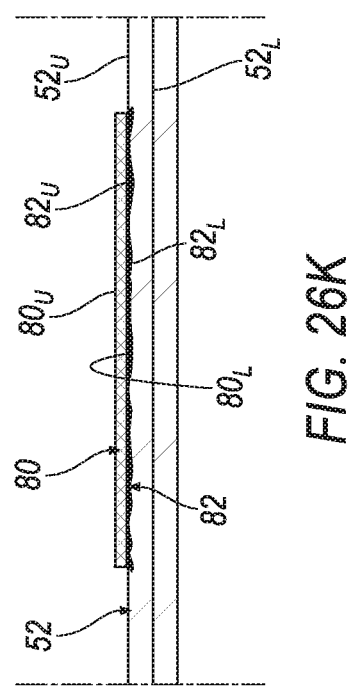
Figure 26K:
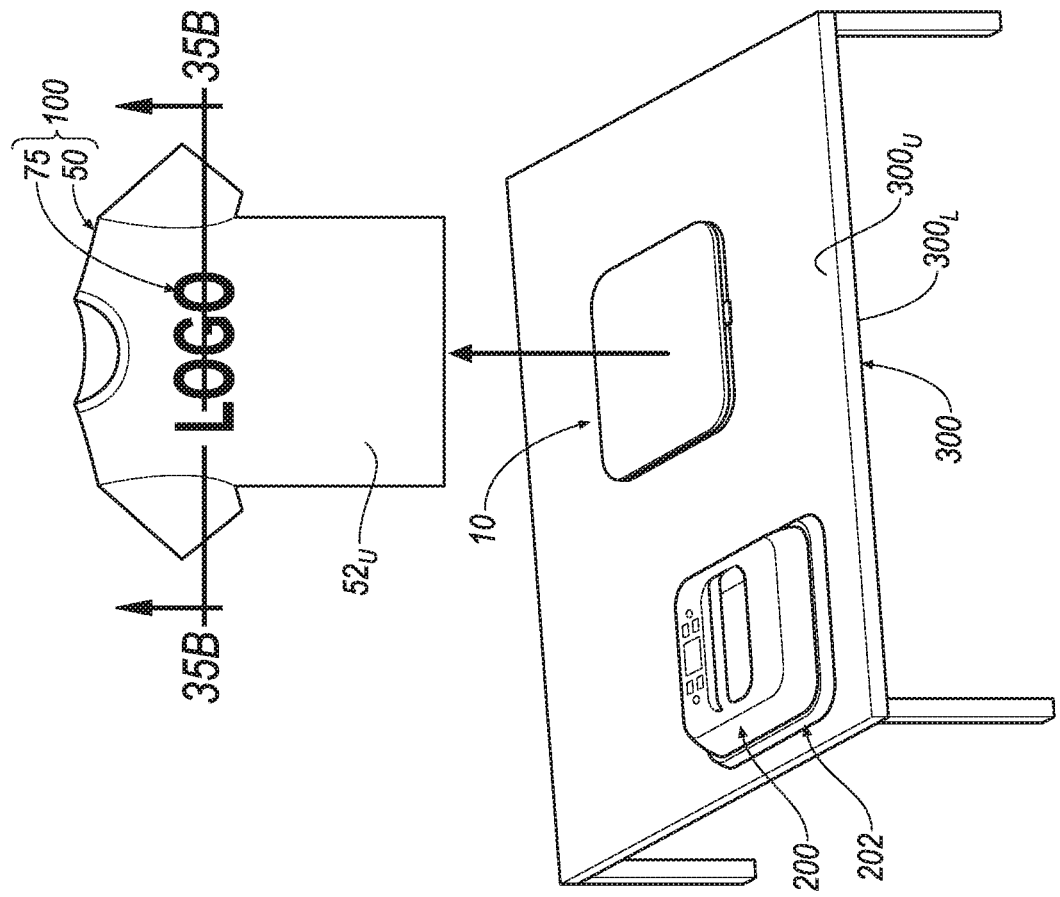

Collectively, as seen at FIGS. 25K and 26K, the plurality of implements 50, 75 define a crafted object 100. Referring to FIGS. 20-21, a first implement 50 of the plurality of implements 50, 75 is a substrate portion of the crafted object 100. As seen at FIGS. 22-24, a second implement 75 of the plurality of implements 50, 75 is a design portion (e.g., text, a logo, a picture, an image or the like) that is to be non-removably-secured to the substrate portion 50 for defining the crafted object 100.

Referring to FIG. 21, the substrate portion 50 includes a body of material 52. The body of material 52 is defined by a thickness $T_{52}$ extending between an upper surface $52_U$ of the body of material 52 and a lower surface $52_L$ of the body of material 52. The body of material 52 may be a fabric material, a paper material or the like. Arrangements of a fabric material may be used for the purpose of sewing or quilting, such as, for example, quilt blocks. The fabric material includes one or more of, for example, cotton, silk, linen, wools, cashmere, leather, ramie, hemp, jute, rayon/viscose, acetate, lycocell, azlon, polyester, nylon, acrylic, spandex, latex, polypropylene, polyethylene, carbon, vinyl. Fabric blends consisting one or more parts of cotton, silk, linen, wools, cashmere, leather, ramie, hemp, jute, rayon/viscose, acetate, lycocell, azlon, polyester, nylon, acrylic, spandex, latex, polypropylene, polyethylene, carbon and vinyl. Furthermore, the fabric may be in the form of, for example, aertex, aida, baize, batiste, bird's eye knit, bombaize, brocade, buckram, cable knit, calico, cambric, charmeuse, chenille, corduroy, caement, cheese cloth, cheviot, chiffon, chino, chintz, crepe, crewel, damask, denim, dimity, double knit, drill, duck or canvas, felt, fiberglass, filter, flannel, flat or jersey knit, fleece knit, foulard, fustian, gabardine, gauze, georgette, gingham, grey or greige, industrial, intarsia knit, interlock stick knit, jacquard knit, kashmir silk, khadi, khaki, lame, laminated, lawn, leno, linsey-woolsey, madras, madras muslin net, mousseline, muslin, narrow laces or tapes, organdy, organza, oxford, percale, plain, pointelle, poplin, purl knit, quilted, raschel knit, reflective, rib stitch knit, satin or sateen, shantung, sheeting, silver knit, taffeta, stretch, tartan, terry knitted, terry cloth, ticking, tissue, tricot knit, velour knitted, velevet, voile, warp knitted and whipcord. In some instances, the body of material 52 may be shaped in any desirable configuration (e.g., wearable apparel, accessories, household goods, decorative goods and the like). Wearable apparel may include but is not limited to, for example, a dress, a raiment, or a vesture such as, for example: a shirt, a sweater, a hat, pants, socks or the like. Accessories may include but is not limited to, for example, a bag, a tote bag, totes, towels or the like. Household goods may include but is not limited to, for example, towels, mats, curtains, blankets, coverings, tablecloths, pillows or the like. Decorative goods may include but is not limited to, for example, canvases, holiday ornamentation, banners, pennants, and the like.

As seen at, for example FIG. 26A, the body of material 52 may contain moisture M. The moisture M may, for example, also be found in surrounding atmosphere A; as such, the body of material 52 may, for example, absorb or wick the moisture M from the surrounding atmosphere A.

Figure 22:
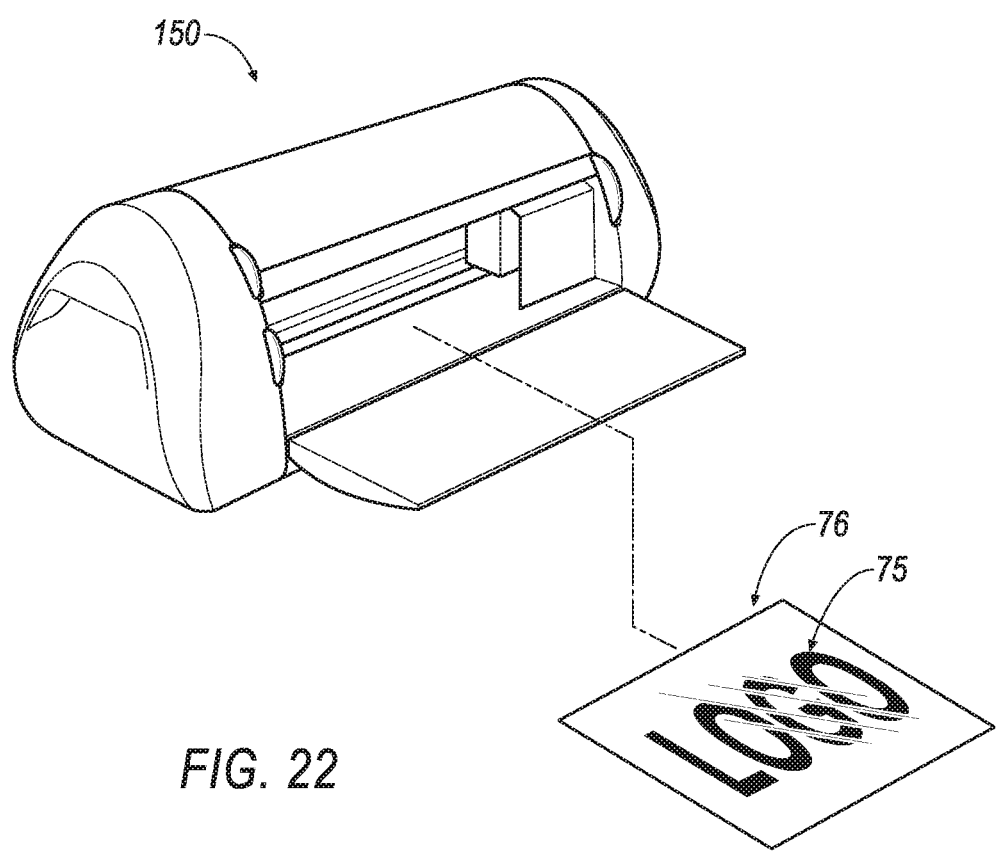
FIG. 22 is a perspective view of a crafting apparatus and a multilayer body including a design portion of a crafted object.

Referring to FIGS. 22-24, the design portion 75 includes a multilayer body 76 (see, e.g., FIG. 24). Referring to FIG. 24, the multilayer body 76 may be formed from a multilayer sheet of material defined by a plurality of layers 78-82. In some instances, one or more of the plurality of layers 78-82 of the multilayer body 76 does not define the design portion 75; accordingly, the multilayer body 76 may be interfaced with a desktop device such as a crafting apparatus 150 that includes at least, for example, a cutting device for cutting into one or more layers of the plurality of layers 78-82 of the multilayer body 76 for forming or defining the design portion 75 from one or more layers (e.g., layers 80, 82) of the plurality of layers 78-82 of the multilayer body 76. The crafting apparatus 150 may alternatively be optionally configured to include a cutting device and a printing device such that the crafting apparatus 150 may conduct a print-and-cut operation on the multilayer body 76 for forming the design portion 75. Although the design portion 75 may be prepared by desktop device such as the crafting apparatus 150, the multilayer body 76 forming the design portion 75 may be pre-manufactured and be purchased "off the shelf", online or by mail order by a consumer.

Referring to FIG. 24, the plurality of layers 78-82 of the multilayer body 76 includes, for example, an optional first layer of material 78, a second layer of material 80 and a third layer of material 82. The optional first layer of material 78 is defined by a thickness $T_{78}$ extending between an upper surface $78_U$ of the optional first layer of material 78 and a lower surface $78_L$ of the optional first layer of material 78. The second layer of material 80 is defined by a thickness $T_{80}$ extending between an upper surface $80_U$ of the second layer of material 80 and a lower surface $80_L$ of the second layer of material 80. The third layer of material 82 is defined by a thickness $T_{82}$ extending between an upper surface $82_U$ of the third layer of material 82 and a lower surface $82_L$ of the third layer of material 82. The lower surface $78_L$ of the optional first layer of material 78 is disposed adjacent the upper surface $80_U$ of the second layer of material 80 for defining the multilayer body 76. The lower surface $80_L$ of the second layer of material 80 is disposed adjacent the upper surface $82_U$ of the third layer of material 82 for defining the multilayer body 76.

The optional first layer of material 78 of the multilayer body 76 may include, for example, a removable layer of transparent plastic film that may be removed (see, e.g., FIGS. 25J and 26J) from the multilayer body 76 and subsequently discarded. The second layer of material 80 of the multilayer body 76 may include, for example, vinyl. The third layer of material 82 of the multilayer body 76 may include, for example, a heat-activated adhesive. At least one or a combination of the second layer of material 80 and the third layer of material 82 may define the design portion 75.

Referring to FIGS. 25A-25K and 26A-26K a method for utilizing the assembly 10 is now described. The assembly 10 provides several functions. In some instances, the assembly 10 supports both of the substrate portion 50 and the design portion 75 during a crafting step. Furthermore, the assembly 10 protects a surface (see, e.g., $300_U$) of a support member such as, for example, a table 300 during a crafting step. The assembly 10 also permits moisture M (see, e.g., FIG. 26A) contained in the substrate portion 50 to pass through some of the layers 12-20 of the assembly 10 (see, e.g., layers 12, 16, 18) but not all of the layers 12-20 of the assembly 10 (see, e.g., layers 14, 20). Yet even further, after the applied heat $H_A$ originating from a heating device 200 passes through the substrate portion 50 and the design portion 75 during a crafting step, the assembly 10 reflects (see, e.g., arrow $H_R$) the applied heat $H_A$ back toward the substrate portion 50 and the design portion 75. Even further, the assembly 10 is permitted to be compressed or compliant when pressure is applied from, for example, one or more of a force imparted by a user or the weight of the heating device 200 during a crafting step.

Referring firstly to FIGS. 25A and 26A, the assembly 10 is arranged upon an upper surface $300_U$ of the table 300. A lower surface $300_U$ of the table 300 is opposite the upper surface $300_U$ of the table 300. Furthermore, the heating device 200 may be arranged upon a docking station 202 that is supported upon the upper surface $300_U$ of the table 300. In the event that the heating device 200 is heated, the docking station 202 mitigates or prevents the applied heat $H_A$ from being directly imparted to the upper surface $300_U$ of the table 300.

As seen at FIG. 26A, the atmosphere A surrounding the assembly 10, the substrate portion 50, the design portion 75, the heating device 200 and the table 300 may include moisture M, which may be, for example, humidity. Accordingly, if, for example, the substrate portion 50 includes a cotton material, the substrate portion 50 may contain or wick some of the moisture M from surrounding atmosphere A.

Referring to FIGS. 25A and 26A, the assembly 10 is arranged upon the upper surface $300_U$ of the table 300. In an example as described above, the lower surface $20_L$ of the bottom layer 20 that may optionally include the indicia or logo 34 including text displaying "This Side Down" such that the user may arrange or dispose may dispose the lower surface $20_L$ of the bottom layer 20 of the assembly 10 adjacent the upper surface $300_U$ of the table 300.

Then, referring to FIGS. 25B and 26B, the substrate portion 50 is arranged over and is at least partially supported by the upper surface $18_U$ of the top layer 18 of the assembly 10. Then, the heating device 200 may be removed from the docking station 202 and may be arranged opposite the substrate portion 50 that is at least partially supported by the upper surface $18_U$ of the top layer 18 of the assembly 10. Then, as seen at FIGS. 25C and 26C, the heating device 200 may be disposed adjacent the substrate portion 50 and at least partially pressed into the substrate portion 50 and the assembly 10 such that the assembly 10 is at least partially compressed.

Referring to FIG. 26C, by arranging the heating device 200 adjacent the substrate portion 50, applied heat $H_A$ from the heating device 200 passes through the substrate portion 50 and then successively though the following layers of the assembly 10: (1) firstly, the top layer 18 of the container portion 24; and (2) secondly, the upper layer 12 of the layered interior body portion 26. Once the applied heat $H_A$ encounters the upper surface $16_U$ of the intermediate layer 16 of the layered interior body portion 26, the applied heat $H_A$ is reflected $H_R$ back toward the substrate portion 50 or to surrounding atmosphere A. The applied heat $H_A$ and/or the reflected heat $H_R$ passing through the substrate portion 50 causes at least some or all of the moisture M contained within the substrate portion 50 to pass successively though the following layers of the assembly 10: (1) firstly, the top layer 18 of the container portion 24; and (2) secondly, the upper layer 12 of the layered interior body portion 26. Once the moisture M encounters the upper surface $16_U$ of the intermediate layer 16 of the layered interior body portion 26, the moisture M is directed away from the lower layer 14 and the bottom layer 20 and in a direction back to surrounding atmosphere A. In addition to at least partially or fully removing the moisture M from the substrate portion 50, the heating device 200 removes most wrinkles from the substrate portion 50 thereby preparing a substantially flat receiving surface for supporting the multilayer body 76 that includes the design portion 75. Removal of the moisture M from the substrate portion 50 assists in the adherence or binding of the heat-activated adhesive defined by the third layer of material 82 of the multilayer body 76 for securing the second layer of material 80 of the multilayer body 76 to the substrate portion 50.

Referring to FIGS. 25D and 26D, the heating device 200 may be removed from the substantially wrinkle-free substrate portion 50. Thereafter, the multilayer body 76 including the design portion 75 is arranged upon the substantially wrinkle-free substrate portion 50. In an example, the third layer of material 82 of the multilayer body 76 defined by a heat-activated adhesive may be disposed adjacent the substantially wrinkle-free substrate portion 50.

As seen at FIGS. 25E and 26E, the heating device 200 is disposed adjacent the multilayer body 76 including the design portion 75. In an example, the heating device 200 is disposed adjacent one of the upper surface $78_U$ of the optional first layer of material 78 of the multilayer body 76 and the upper surface $80_U$ of the second layer of material 80 of the multilayer body 76. Referring to FIG. 26E, by arranging the heating device 200 adjacent the multilayer body 76 including the design portion 75, applied heat $H_A$ from the heating device 200 passes through the multilayer body 76 including the design portion 75 and then the substrate portion 50 and then successively though the following layers of the assembly 10: (1) firstly, the top layer 18 of the container portion 24; and (2) secondly, the upper layer 12 of the layered interior body portion 26. Once the applied heat $H_A$ encounters the upper surface $16_U$ of the intermediate layer 16 of the layered interior body portion 26, the applied heat $H_A$ is reflected $H_R$ back toward the substrate portion 50 and the multilayer body 76 including the design portion 75 or to surrounding atmosphere A. The applied heat $H_A$ and/or the reflected heat $H_R$ passing through multilayer body 76 including the design portion 75 results in the third layer of material 82 of the multilayer body 76 defined by a heat-activated adhesive being "activated" for securing, for example, the vinyl material defined by the second layer of material 80 of the multilayer body 76 of the design portion 75 to the substantially wrinkle-free substrate portion 50. Furthermore, the applied heat $H_A$ and/or the reflected heat $H_R$ passing through multilayer body 76 including the design portion 75 and the substrate portion 50 may also further remove moisture M from the substrate portion 50 in a similar manner as described above.

Referring to FIGS. 25F and 26F, the heating device 200 is then removed from the multilayer body 76 including the design portion 75 attached thereto by way of the third layer of material 82 of the multilayer body 76. The substrate portion 50 including the design portion 75 secured thereto (as a result of the activation of the third layer of material 82 of the multilayer body 76 including the design portion 75) is then removed from the assembly 10 and turned or flipped over such that, as seen at FIGS. 25G and 26G, the upper surface $78_U$ of the optional first layer of material 78 of the multilayer body 76 and the upper surface $80_U$ of the second layer of material 80 of the multilayer body 76 is disposed adjacent the upper surface $18_U$ of the top layer 18 of the assembly 10. Then, as seen at FIGS. 25H and 26H, the heating device 200 is disposed adjacent a side of the substrate portion 50 that is opposite the side of the substrate portion 50 that is secured to the third layer of material 82 of the multilayer body 76 including the design portion 75. The applied heat $H_A$ and/or the reflected heat $H_R$ passing through multilayer substrate portion 50 and the multilayer body 76 including the design portion 75 may also further remove moisture M from the substrate portion 50 in a similar manner as described above and further activate the third layer of material 82 of the multilayer body 76 for further securing the multilayer body 76 including the design portion 75 to the substrate portion 50.

Referring to FIGS. 25I and 26I, the heating device 200 may be removed from the substrate portion 50 and then returned to the docking station 202. The substrate portion 50 including the third layer of material 82 of the multilayer body 76 secured thereto is then flipped over and is optionally placed upon the upper surface $18_U$ of the top layer 18 of the assembly 10 or the upper surface $300_U$ of the table 300. Referring to FIGS. 25J and 26J, the optional first layer of material 78 of the multilayer body 76 is detached or removed from the upper surface $80_U$ of the second layer of material 80 of the multilayer body 76 such that the second layer of material 80 is secured to the substrate portion 50 by the heat-activated adhesive defined by the third layer of material 82 of the multilayer body 76. Referring to FIGS. 25K and 26K, the design portion 75 defined by the second layer of material 80 and the third layer of material 82 of the multilayer body 76 is secured to the substrate portion 50 for defining the crafted object 100.

In some instances, collectively, the layers 12-20 of the assembly 10 maintains a constant application of the applied heat $H_A$ and the reflected heat $H_R$ to the substrate portion 50 and the design portion 75 (rather than permitting an underlying support member such as the table 300 to absorb and dissipate the applied heat $H_A$ (rather than returning applied heat $H_A$ back toward the substrate portion 50 and the design portion 75 as the reflected heat $H_R$). Furthermore, in order to permit one or more of the functions described above associated with the assembly 10 (e.g., the passage of moisture M from the substrate portion 50 into the assembly 10 and/or the passage of applied heat $H_A$ through and reflected $H_R$ toward one or both of the substrate portion 50 and the design portion 75), the layers 12-20 may be defined by the following materials.

In some examples, the upper layer 12 of the layered interior body portion 26 may be defined as a gas permeable layer that permits the moisture M and the applied heat $H_A$ and/or reflected heat $H_R$ to pass there-through. Furthermore, the upper layer 12 may absorb the moisture M and the applied heat $H_A$ and/or reflected heat $H_R$ may thereafter evaporate the moisture M to surrounding atmosphere A. Yet even further, while permitting the applied heat $H_A$ and/or reflected heat $H_R$ to pass there-through, the upper layer 12 insulates downstream layers (e.g., in successive order, the layers 16, 14, 20) from the high temperatures of the applied heat $H_A$ and/or reflected heat $H_R$ such that the assembly 10 does not absorb all of the applied heat $H_A$. In some instances, the upper layer 12 of the layered interior body portion 26 includes, for example, a felt material or a polyester felt material. In some implementations, the upper layer 12 of the layered interior body portion 26 may be defined by a density of 0.13 g/cm$^3$. In other implementations, the upper layer 12 of the layered interior body portion 26 may be defined by a density of 0.14 g/cm$^3$.

In some examples, the lower layer 14 of the layered interior body portion 26 may be defined as: (1) an (liquid or gas) impermeable; (2) an insulating; and (3) a compressive layer. The lower layer 14 protects or insulates a support surface (see, e.g., upper surface $300_U$ of the table 300) from applied heat $H_A$ from the heating device 200 while also being compressive or compliant in order to absorb a force imparted by a user to and/or the weight of the heating device 200. Furthermore, the lower layer 14 may not absorb moisture M and/or direct evaporated moisture M to surrounding atmosphere A. The lower layer 14 is heat resistant and does not absorb moisture M. In some instances, the lower layer 14 of the layered interior body portion 26 includes a foam material, a silicon material, a silicon foam material, a variable density silicon foam material, a high density polyethylene material or a low density polyethylene material. In some implementations, the lower layer 14 of the layered interior body portion 26 may be defined by a density of 0.11 g/cm$^3$. In other implementations, the lower layer 14 of the layered interior body portion 26 may be defined by a density of 0.04 g/cm$^3$.

In some examples, the intermediate layer 16 of the layered interior body portion 26 is defined as: (1) an (liquid or gas) impermeable; and (2) heat reflective layer (i.e., the intermediate layer 16 is a moisture barrier and heat reflective layer). Accordingly, the intermediate layer 16 does not permit the moisture M to pass through to downstream layering (e.g., the layer 20) of the assembly 10. Furthermore, the intermediate layer 16 reflects (see, e.g., arrow $H_R$) the applied heat $H_A$ back toward the substrate portion 50 and the design portion 75. In some instances, the intermediate layer 16 of the layered interior body portion 26 may include a metal material, a foil material, an aluminum material or a metalized Mylar material. In some example, prior to being incorporated into the assembly 10, the intermediate layer 16 is heated (to a temperature of, for example about 360° F.) and pre-shrunk such that the intermediate layer 16 does not shrink after a first use by a user when the applied heat $H_A$ is applied thereto from the heating device 200. In some implementations, the intermediate layer 16 of the layered interior body portion 26 may be defined by a density of 0.392 g/cm$^3$. In other implementations, the intermediate layer 16 of the layered interior body portion 26 may be defined by a density of 0.72 g/cm$^3$.

In some examples, the top layer 18 of the container portion 24 is defined as a (gas) permeable layer that permits the moisture M and the applied heat $H_A$ and/or reflected heat $H_R$ to pass there-through while resistant high temperatures associated with, in some instances, the heating device 200 providing applied heat $H_A$ ranging between, for example 360° F.-400° F. In some instances, the top layer 18 of the container portion 24 may include a cotton material, a metal-sprayed cotton material or a ceramic-coated cotton material. In some implementations, the top layer 18 of the container portion 24 may be defined by a density of 0.46 g/cm$^3$. In other implementations, the top layer 18 of the container portion 24 may be defined by a density of 0.41 g/cm$^3$.

In some examples, the bottom layer 20 of the container portion 24 is defined as an insulating layer that protects or insulates a support surface (see, e.g., upper surface $300_U$ of the table 300) from applied heat $H_A$ from the heating device 200. In some instances, the bottom layer 18 of the container portion 24 may include a polymer material, a polyurethane (PU) material or a polyester-and-polyurethane (PU) material. In some implementations, the bottom layer 20 of the container portion 24 may be defined by a density of 0.54 g/cm$^3$. In other implementations, the bottom layer 20 of the container portion 24 may be defined by a density of 0.68 g/cm$^3$.

Referring to FIGS. 27-29, the assembly 10 may be contained by packaging 400. The packaging 400 includes a substantially C-shaped or U-shaped body defined by a front flap portion 402, a rear flap portion 404 and an intermediate flap portion 406 connecting the front flap portion 402 to the rear flap portion 404. The front flap portion 402, the rear flap portion 404 and the intermediate flap portion 406 define a cavity 408 that is sized for receiving the thickness $T_{24}$ of the container portion 24 of the assembly 10. Furthermore, each of the front flap portion 402, the rear flap portion 404 and the intermediate flap portion 406 are defined by a width $W_{400}$. Yet even further, the front flap portion 402, the rear flap portion 404 may be defined by a length $L_{400}$.

The width $W_{400}$ of the front flap portion 402, the rear flap portion 404 and the intermediate flap portion 406 is substantially equal to or slightly greater than the width $W_{24}$ of container portion 24 of the assembly 10. The $L_{400}$ of the front flap portion 402 and the rear flap portion 404 may be optionally less than the length $L_{24}$ of container portion 24 of the assembly 10 such that at least a portion of the upper surface $18_U$ of the top layer 18/upper surface $24_U$ of the container portion 24 of the assembly 10 or the lower surface $20_L$ of the bottom layer 20/lower surface $24_L$ of the container portion 24 of the assembly 10 is viewable by a consumer or user. Furthermore, the $L_{400}$ of the front flap portion 402 and the rear flap portion 404 may be optionally less than the length $L_{24}$ of container portion 24 of the assembly 10 such that one or both of the optional tag 32 and the optional indicia or logo 34 that may include, for example, the product identifier that defines, for example, a tradename, manufacturer or other form of identification is not obscured by the packaging 400 such that one or both of the optional tag 32 and the optional indicia or logo 34 is viewable to a consumer or user such that a consumer is able to associate a level of quality associated with the manufacture of the assembly 10 and/or is not otherwise deceived by an "off brand" product during the course of display of the assembly 10 within the packaging 400.

In some instances, the packaging 400 and the assembly 10 may be packaged within a clear container or plastic casing or bag. In some examples, the assembly 10 is secured to the packaging with, for example, a plastic stitch, adhesive or the like. In other examples, the packaging 400 may also include passage 410 and a hook 412 that extends through the passage 410.

The hook 412 is secured to one of the front flap portion 402, the rear flap portion 404 and the intermediate flap portion 406. The passage 410 is formed by the intermediate flap portion 406. The passage 410 may be defines by rectangular or oval shape. In some examples, the passage 410 may be centrally located on the intermediate flap portion 406.

A number of implementations have been described. Nevertheless, it will be understood that various modifications may be made without departing from the spirit and scope of the disclosure. Accordingly, other implementations are within the scope of the following claims.

What is claimed is:

1. An assembly comprising:
    a crafting mat including a container portion defining a cavity and a layered interior body portion disposed within the cavity;
    wherein the container portion includes
        a permeable top layer, wherein the permeable top layer is defined by a thickness ranging from 0.10 mm to 1.24 mm, and
        an impermeable and insulative bottom layer connected to the permeable top layer for defining the cavity, wherein the impermeable and insulative bottom layer is defined by a thickness ranging from 0.10 mm to 1.50 mm;
    wherein the layered interior body portion includes
        a permeable upper layer, wherein the permeable upper layer is defined by a thickness ranging from 1.50 mm to 7.85 mm,
        an impermeable and insulative lower layer, wherein the impermeable and insulative lower layer is defined by a thickness ranging from 5.00 mm to 20.00 mm, and
        an impermeable and heat-reflective intermediate layer disposed between the permeable upper layer and the impermeable and insulative lower layer, wherein the impermeable and heat-reflective intermediate layer is defined by a thickness ranging from 0.15 mm to 1.25 mm.

2. The assembly of claim 1, wherein:
    the permeable top layer is configured to permit moisture from a substrate portion and applied heat from a heating device that passed through the substrate portion to pass there-through;
    the permeable upper layer is configured to permit moisture from the substrate portion and applied heat from the heating device that passed through the substrate portion to pass there-through;
    the impermeable and heat-reflective intermediate layer is configured to reflect the applied heat as reflected heat back toward and through the substrate portion;
    the impermeable and insulative lower layer is configured to not permit moisture from the substrate portion to pass there-through; and
    the impermeable and insulative bottom layer is configured to not permit moisture from the substrate portion to pass there-through.

3. The assembly of claim 1, wherein the permeable upper layer, the impermeable and insulative lower layer and the impermeable and heat-reflective intermediate layer are not adhered to one another and are permitted to laterally shift or float relative one another within the cavity of the container portion.

4. The assembly of claim 1,
    wherein the permeable top layer includes a cotton material or a metal-sprayed cotton material,
    wherein the permeable upper layer includes a felt material or a polyester felt material,
    wherein the impermeable and heat-reflective intermediate layer includes a metallic material or a pre-shrunk metallic material,
    wherein the impermeable and insulative lower layer includes a foam material or a silicon foam material,
    wherein the impermeable and insulative bottom layer includes a polymer material or a polyurethane material.

5. The assembly of claim 1, wherein a thickness of the crafting mat is defined by:
    the thickness of the permeable top layer and the thickness of the impermeable and insulative bottom layer; and
    a height of the cavity of the container portion, wherein the height of the cavity of the container portion is sized for receiving and approximately equal to
        the thickness of the permeable upper layer, the thickness of the impermeable and insulative lower layer and the thickness of the impermeable and heat-reflective intermediate layer that defines the layered interior body portion.

6. The assembly of claim 5, wherein the thickness of the crafting mat is defined by a thickness ranging from 6.85 mm to 31.84 mm.

7. The assembly of claim 6, wherein the thickness of the crafting mat is equal to 12.93 mm.

8. The assembly of claim 6,
    wherein the thickness of the permeable top layer is approximately equal to 0.25 mm,
    wherein the thickness of the permeable upper layer is approximately equal to 2.20 mm,
    wherein the thickness of the impermeable and heat-reflective intermediate layer is approximately equal to 0.23 mm,
    wherein the thickness of the impermeable and insulative lower layer is approximately equal to 10.00 mm,
    wherein the thickness of the impermeable and insulative bottom layer is approximately equal to 0.25 mm.

9. The assembly of claim 1 further comprising
    a fastening portion that secures the permeable top layer to the impermeable and insulative bottom layer.

10. The assembly of claim 1 further comprising
a tag secured to one or both of the permeable top layer to the impermeable and insulative bottom layer; and
indicia applied to the tag.

11. The assembly of claim 1 further comprising
indicia applied to one or both of the permeable top layer and the impermeable and insulative bottom layer.

12. An assembly comprising: a crafting mat including a container portion defining a cavity and a layered interior body portion disposed within the cavity; wherein the container portion includes a top layer configured to permit moisture from a substrate portion and applied heat from a heating device that passed through the substrate portion to pass there-through; and a bottom layer configured to not permit moisture from the substrate portion to pass there-through, connected to the top layer for defining the cavity; wherein the layered interior body portion includes an upper layer configured to permit moisture from the substrate portion and applied heat from the heating device that passed through the substrate portion to pass there-through; a lower layer; and an intermediate layer disposed between the upper layer and the lower layer, configured to reflect the applied heat as reflected heat back toward and through the substrate portion.

13. The assembly of claim 12, wherein the lower layer is configured to not permit moisture from the substrate portion to pass there-through.

14. The assembly of claim 12, wherein the upper layer, the lower layer and the intermediate layer are not adhered to one another and are permitted to laterally shift or float relative one another within the cavity of the container portion.

15. The assembly of claim 12, wherein the top layer is permeable, wherein the bottom layer is impermeable and insulative, wherein the upper layer is permeable, wherein the lower layer is impermeable and insulative, wherein the intermediate layer is impermeable and heat-reflective.

16. The assembly of claim 12,
wherein the top layer includes a cotton material or a metal-sprayed cotton material,
wherein the upper layer includes a felt material or a polyester felt material,
wherein the intermediate layer includes a metallic material or a pre-shrunk metallic material,
wherein the lower layer includes a foam material or a silicon foam material,
wherein the bottom layer includes a polymer material or a polyurethane material.

17. The assembly of claim 12, wherein a thickness of the crafting mat is defined by:
a thickness of the top layer and a thickness of the bottom layer; and
a height of the cavity of the container portion, wherein the height of the cavity of the container portion is sized for receiving and equal to
a thickness of the upper layer, a thickness of the lower layer and a thickness of the intermediate layer that defines the layered interior body portion,
wherein the top layer is defined by a thickness ranging from 0.10 mm to 1.24 mm, wherein the upper layer is defined by a thickness ranging from 1.50 mm to 7.85 mm, wherein the intermediate layer is defined by a thickness ranging from 0.15 mm to 1.25 mm, wherein the lower layer is defined by a thickness ranging from 5.00 mm to 20.00 mm, wherein the bottom layer is defined by a thickness ranging from 0.10 mm to 1.50 mm.

18. The assembly of claim 17, wherein the thickness of the crafting mat is defined by a thickness ranging from 6.85 mm to 31.84 mm.

19. The assembly of claim 18, wherein the thickness ($T_{24}$) of the crafting mat (10) is equal to 12.93 mm.

20. The assembly of claim 18,
wherein the thickness of the top layer is equal to 0.25 mm,
wherein the thickness of the upper layer is equal to 2.20 mm,
wherein the thickness of the intermediate layer is equal to 0.23 mm,
wherein the thickness of the lower layer is equal to 10.00 mm,
wherein the thickness of the bottom layer is equal to 0.25 mm.

21. The assembly of claim 12 further comprising a fastening portion that secures the top layer to the bottom layer.

22. The assembly of claim 12 further comprising
a tag secured to one or both of the top layer to the bottom layer; and
indicia applied to the tag.

23. The assembly of claim 12 further comprising indicia applied to one or both of the top layer and the bottom layer.

24. The assembly of claim 12, wherein the lower layer is compressive.

* * * * *